US012771507B2

(12) United States Patent
Liu

(10) Patent No.: US 12,771,507 B2
(45) Date of Patent: Oct. 20, 2026

(54) PUSCH INDICATION METHOD AND APPARATUS, AND PUSCH SENDING METHOD AND APPARATUS

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 517 days.

(21) Appl. No.: 18/032,799

(22) PCT Filed: Oct. 19, 2020

(86) PCT No.: PCT/CN2020/121953
§ 371 (c)(1),
(2) Date: Apr. 19, 2023

(87) PCT Pub. No.: WO2022/082372
PCT Pub. Date: Apr. 28, 2022

(65) Prior Publication Data

US 2023/0370227 A1 Nov. 16, 2023

(51) Int. Cl.
*H04L 5/00* (2006.01)
*H04B 7/0456* (2017.01)
*H04W 72/21* (2023.01)

(52) U.S. Cl.
CPC ......... *H04L 5/0051* (2013.01); *H04B 7/0456* (2013.01); *H04W 72/21* (2023.01)

(58) Field of Classification Search
None
See application file for complete search history.

(56) References Cited

U.S. PATENT DOCUMENTS

2018/0367205 A1* 12/2018 Liu ........................ H04W 24/10
2020/0100232 A1 3/2020 Onggosanusi et al.
(Continued)

FOREIGN PATENT DOCUMENTS

CN 107889256 A 4/2018
CN 110838856 A 2/2020
(Continued)

OTHER PUBLICATIONS

The Partial Supplementary European Search Report of PCT/CN2020121953 dated on Jun. 20, 2024 (13p).
Search Report for EP application 20957961.4 dated 0/24/2024, (14p).
INOA for issued in Application No. 202347034352, dated Nov. 29, 2024, (2p).

(Continued)

*Primary Examiner* — Luna Weissberger
(74) *Attorney, Agent, or Firm* — Arch & Lake LLP; Hao Tan; Shen Wang

(57) ABSTRACT

A method for indicating a PUSCH is provided. In the method, a base station configures for a terminal one or more SRS resource sets, where SRS resources in the SRS resource sets are associated with beam related information. Further, the base station determines a plurality of beams for uplink cooperative transmission and indication information corresponding to each of the plurality of beams according to an SRS sent by the terminal based on the SRS resources, where each of the plurality of beams corresponds to a different TRP in the base station. Moreover, the base station sends a plurality of pieces of the indication information to the terminal, where the indication information is configured to instruct the terminal to determine the beam related information corresponding to a beam for the uplink cooperative transmission, and send the PUSCH based on the beam corresponding to the beam related information determined.

16 Claims, 15 Drawing Sheets

(56) References Cited

U.S. PATENT DOCUMENTS

| | | | | |
|---|---|---|---|---|
| 2020/0329487 | A1 | 10/2020 | Chen et al. | |
| 2021/0367730 | A1 | 11/2021 | Chen et al. | |
| 2023/0027791 | A1* | 1/2023 | Yuan | H04L 5/0053 |
| 2023/0224125 | A1* | 7/2023 | Yuan | H04L 5/0023<br>370/329 |
| 2023/0396373 | A1* | 12/2023 | Gao | H04L 1/189 |

FOREIGN PATENT DOCUMENTS

| | | | |
|---|---|---|---|
| CN | 111512582 | A | 8/2020 |
| KR | 20190142182 | A | 12/2019 |
| WO | 2019124983 | A1 | 6/2019 |
| WO | 2020150943 | A1 | 7/2020 |
| WO | 2020155179 | A1 | 8/2020 |
| WO | 2020209597 | A1 | 10/2020 |

OTHER PUBLICATIONS

The first CNOA issued in Application No. CN application 202080002513.X with English translation, dated Nov. 28, 2022, (26p).

Moderator (Samsung), "Moderator summary for multi-beam enhancement: proposal categorization", 3GPP TSG RAN WG1 #102-e,R1-2006985, e-Meeting, Aug. 17-28, 2020, (27p).

International Search Report issued in Application No. PCT/CN2020/121953, dated Jul. 15, 2021, with English translation, (4p).

CATT, "Discussion on enhancement on multi-beam operation", 3GPP TSG RAN WG1 #102-e, R1-2005683, e-Meeting, Aug. 17-28, 2020, (5p).

Office action of IN application 202347034352 dated Nov. 2, 2023, (5 p).

* cited by examiner

PUSCH INDICATION METHOD AND APPARATUS, AND PUSCH SENDING METHOD AND APPARATUS

CROSS-REFERENCE TO RELATED APPLICATION

The present application is the national phase application under 35 USC § 371 of International Application PCT/CN2020/121953, filed Oct. 19, 2020, the entire disclosures of which are incorporated herein by reference for all purposes.

TECHNICAL FIELD

The present disclosure relates to a communication technical field, and more particularly to a method for indicating a physical uplink shared channel (PUSCH), a method for sending a PUSCH, an apparatus for indicating a PUSCH, an apparatus for sending a PUSCH, an electronic device and a computer-readable storage medium.

BACKGROUND

In a related art, in a physical uplink shared channel (PUSCH) transmission mechanism based on a codebook transmission, a base station only indicates a spatial relationship information to a terminal and only determines a set of scheduling parameters for sending the PUSCH, which cannot support cooperative transmission of multiple antenna panels in the terminal, and can hardly meet requirements of services which need improved transmission of the PUSCH.

SUMMARY

In view of this, in order to solve the technical problems in the related art, embodiments of the present disclosure provide a method for indicating a PUSCH, a method for sending a PUSCH, an apparatus for indicating a PUSCH, an apparatus for sending a PUSCH, an electronic device and a computer-readable storage medium.

According to a first aspect of the present disclosure, a method for indicating a physical uplink shared channel (PUSCH) is provided, which includes: configuring, by a base station and for a terminal one or more sounding reference signal (SRS) resource sets, where SRS resources in the SRS resource sets are associated with beam related information; determining, by the base station, a plurality of beams for uplink cooperative transmission and indication information corresponding to each of the plurality of beams according to an SRS sent by the terminal based on the SRS resources, where each of the plurality of beams corresponds to a different transmission and reception point (TRP) in the base station; and sending, by the base station, a plurality of pieces of the indication information to the terminal, where the indication information is configured to instruct the terminal to determine the beam related information corresponding to a beam for the uplink cooperative transmission, and send the PUSCH based on the beam corresponding to the beam related information determined.

According to a second aspect of the present disclosure, a method for sending a PUSCH is provided, which includes: receiving, by a terminal, one or more SRS resource sets for uplink data transmission scheduling and configured by a base station, where SRS resources in the SRS resource sets are associated with beam related information; sending, by the terminal, an SRS to the base station based on the SRS resources; receiving, by the terminal, indication information corresponding to each of a plurality of beams for uplink cooperative transmission determined by the base station according to the SRS received, where each of the plurality of beams corresponds to a different TRP in the base station; and determining, by the terminal, beam related information corresponding to a beam for the uplink cooperative transmission according to the indication information, and sending, by the terminal, the PUSCH to the base station based on the beam corresponding to the beam related information determined.

According to a third aspect of the present disclosure, an electronic device is provided, which includes: a processor; and a memory for storing instructions executable by the processor. Furthermore, the processor is configured to implement the method for indicating the PUSCH according to the first aspect.

BRIEF DESCRIPTION OF THE DRAWINGS

In order to more clearly illustrate the technical solutions in embodiments of the present disclosure, the accompanying drawings used in description of embodiments will be briefly introduced below. Apparently, the drawings in the following description are only some embodiments of the present disclosure. For those skilled in the art, other drawings may also be obtained based on these drawings without any creative work.

DETAILED DESCRIPTION

The technical solutions in embodiments of the present disclosure will be clearly and completely described below with reference to the accompanying drawings in embodiments of the present disclosure. Apparently, the described embodiments are only some of embodiments of the present disclosure, not all embodiments of the present disclosure. Based on embodiments of the present disclosure, all other embodiments obtained by those skill in the art without making creative works belong to the protection scope of the present disclosure.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

Figure 1:
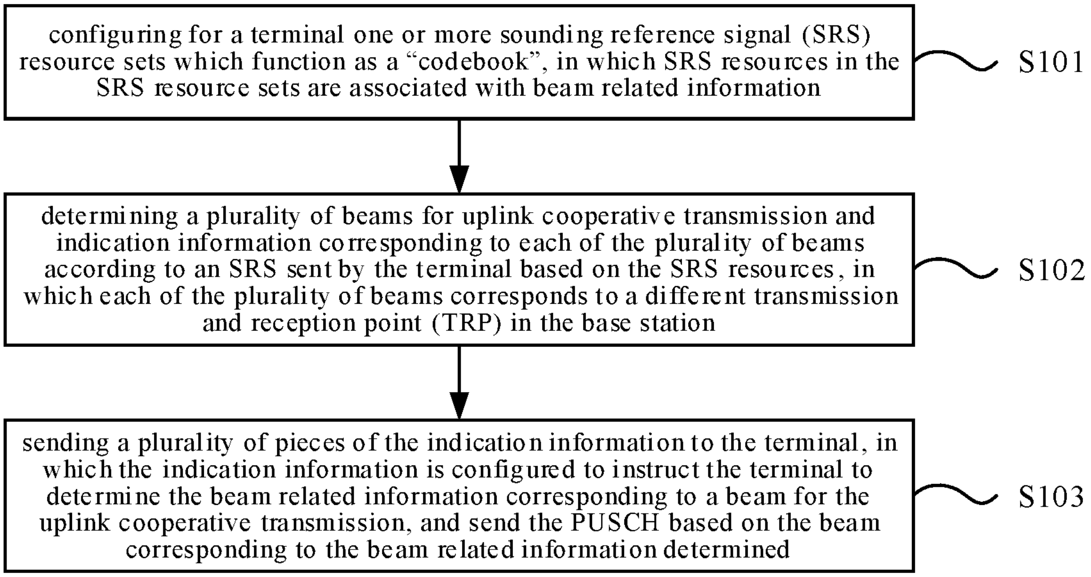
FIG. 1 is a flowchart illustrating a method for indicating a PUSCH according to an embodiment of the present disclosure.

FIG. 1 is a flowchart illustrating a method for indicating a PUSCH according to an embodiment of the present disclosure. The method for indicating the PUSCH shown in embodiments may be performed by a base station, and the base station includes, but is not limited to, a 4G base station, a 5G base station and a 6G base station. The base station may communicate with a terminal that is used as a user device. The terminal may include, but is not limited to, an electronic device such as a mobile phone, a tablet computer, a wearable device, a sensor, an Internet of Things device, and the like. In one embodiment, the terminal may be a terminal suitable for a method for sending a PUSCH in any one of the subsequent embodiments.

As shown in FIG. 1, the method for indicating the PUSCH may include steps as follows.

In step S101, one or more sounding reference signal (SRS) resource sets which function as a "codebook" is configured for a terminal, and SRS resources in the SRS resource sets are associated with beam related information.

In step S102, a plurality of beams for uplink cooperative transmission and indication information corresponding to each of the plurality of beams are determined according to an SRS sent by the terminal based on the SRS resources, and each of the plurality of beams corresponds to a different transmission and reception point (TRP) in the base station.

In step S103, a plurality of pieces of the indication information are sent to the terminal. The indication information is configured to instruct the terminal to determine the beam related information corresponding to a beam for the uplink cooperative transmission, and send the PUSCH based on the beam corresponding to the beam related information determined.

In one embodiment, precoding may include precoding based on codebooks and precoding based on non-codebooks. Embodiments in the present disclosure are applied in precoding scenarios based on the codebooks.

One or more SRS resource sets that have a codebook usage is configured for the terminal. The SRS resources in the sets are associated with the beam related information. The beam related information may be spatial relation information (SpatialRelationInfo) or other information associated with the beam.

After receiving the SRS resource set, the terminal may determine the beam related information associated with each of the SRS resources, and determine the beam corresponding to the SRS resource based on the beam related information. In case of sending the SRS based on the SRS resource, specifically on the SRS resource, the SRS is sent via the beam corresponding to the SRS resource.

For example, if a plurality of antenna panels are provided in the terminal, and different antenna panels correspond to different beams (different beams may have different beam directions), the terminal may determine an antenna panel corresponding to the beam associated with the SRS resource, and send the SRS on the SRS resource via the antenna panel corresponding to the SRS.

On a basis of this, the terminal may send the SRS to the base station via the plurality of beams on the plurality of SRS resources. After the base station receives the SRS, the base station may detect an uplink channel based on the SRS received to determine a plurality of beams suitable for cooperative transmission of the plurality of the antenna panels in the terminal. For example, signal strength information of the SRS received may be detected to determine the beam associated with the SRS resource where a channel strength is greater than a preset strength value, which is suitable for cooperative transmission of the plurality of the antenna panels in the terminal.

In order to indicate a plurality of beams to the terminal, the base station may further determine indication information corresponding to each of the beams. Each of the beams corresponds to a different transmission and reception point (TRP) in the base station, and the base station may send the indication information to the terminal. The indication information may indicate the terminal to determine the beam related information corresponding to the beam used for uplink cooperative transmission, and send the PUSCH based on the beam corresponding to the beam related information determined.

After the terminal receives a plurality of pieces of the indication information, the terminal may determine the beam related information corresponding to the beam that is used for uplink cooperative transmission and corresponds to the indication information, and send the PUSCH based on the beam corresponding to the beam related information determined. Specifically, the beam for uplink cooperative transmission and the antenna panel corresponding to each of the beams may be determined according to the beam related information, and the PUSCH is sent to the base station on the corresponding beam via the plurality of the antenna panels.

On a basis of this, the base station may determine a plurality of the beams used for cooperative transmission and indication information corresponding to each beam, thus indicating the terminal via a plurality of indications corresponding to the plurality of the beams. In this way, the terminal may determine the plurality of the beams used for cooperative transmission and the antenna panels corresponding to the plurality of the beams according to the indication information, thus performing cooperative transmission via the plurality of the antenna panels to meet the requirements of services which need improved transmission of the PUSCH. The services include, but are not limited to, ultra-reliable and low latency communication (URLLC) services.

Figure 2:
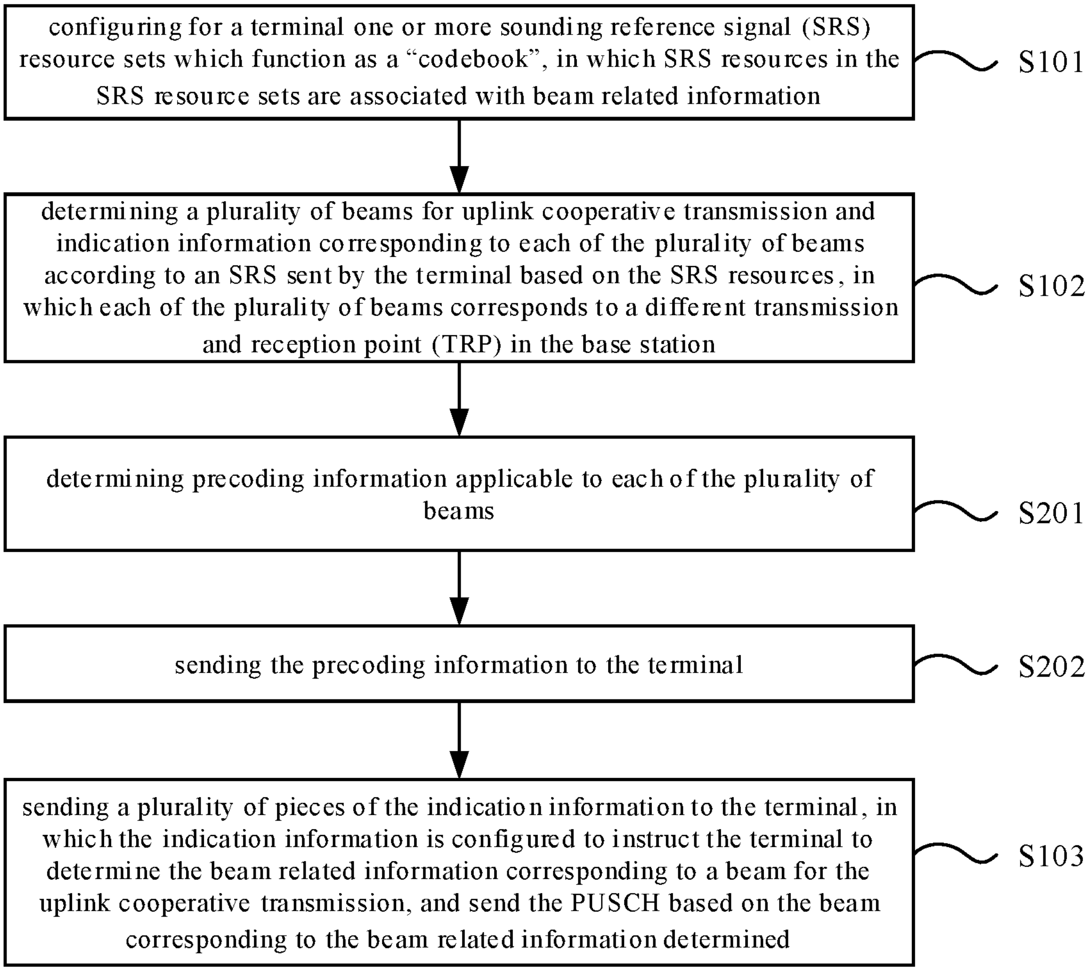
FIG. 2 is a flowchart illustrating a method for indicating a PUSCH according to another embodiment of the present disclosure.

FIG. 2 is a flowchart illustrating a method for indicating a PUSCH according to another embodiment of the present disclosure. As shown in FIG. 2, the method further includes steps as follows.

In step S201, precoding information applicable to each of the plurality of beams is determined.

In step S202, the precoding information is sent to the terminal.

In one embodiment, the base station may detect an uplink channel of the SRS received and determine the precoding information applicable to each of the beams. The precoding information includes, but is not limited to, precoding matrix indication information TPMI and rank indication information RI. Determining the precoding information includes, but is not limited to, a singular value decomposition (SDV) algorithm, an equation-based eigenvalue solving algorithm, a maximum $\|HW\|$ selection algorithm, and the like, and a specific selection may be made as needed, which is not limited in the present disclosure.

A plurality of pieces of precoding information corresponding to a plurality of beams may be sent to the terminal. The terminal may precode the PUSCH on the beam corresponding to the precoding information according to the precoding information, and send the PUSCH precoded on the beam corresponding to the precoding information.

Alternatively, the indication information includes at least one of:

an SRS resource indication identifier (SRI) or an uplink transmission configuration indication (UL TCI) state index.

In one embodiment, the indication information sent by the base station to the terminal may be the SRI or the UL TCI state index.

In case that the indication information is the SRI, the terminal may determine an SRI resource indicated by the SRI, for example, determine the SRS resource indicated by the SRI in the SRS resource sets, so as to determine the beam related information associated with the SRS resource.

In case that the indication information is the UL TCI state index, the terminal may determine a UL TCI state indicated by the UL TCI state index, and then determine the beam related information corresponding to the beam used for uplink cooperative transmission corresponding to a reference signal in the UL TCI state. The reference signal may be the SRS or the CSI-RS, which may be selected as needed.

In a related art, a downlink TCI state may be used to indicate a beam for downlink transmission. In embodiments of the present disclosure, the UL TCI state index is used as an indication to indicate the beam for uplink transmission to make the indication manner for the uplink be more consistent with the indication manner for the downlink, which is conducive to simplifying the indication logic and reducing the complexity of indication operations of the base station.

In one embodiment, for example, the indication information is the SRI, the base station sends m SRIs to the terminal, where m is the number of the antenna panels for uplink cooperative transmission supported by the terminal. The base station may preconstruct m candidate sets, i.e., SRS1 to SRSm, and the base station may indicate the SRI in the candidate set SRSi through $\log_2(N_{SRSi})$ bits, where $N_{SRSi}$ represents the number of SRIs in the candidate set SRSi, and $1 \leq i \leq m$.

In addition, for each SRS resource indicated by the SRI, the base station may calculate precoding information. For example, for the m SRS resources indicated by the m SRIs, m pieces of the precoding information may be calculated. For example, the precoding information includes TPMI and RI, m TPMIs and m RIs may be calculated. The $i^{th}$ precoding information corresponds to the SRS resource indicated by the $i^{th}$ SRI, i.e., corresponds to the antenna panel and the beam corresponding to the SRS resource. That is, in case of sending the PUSCH via an $i^{th}$ antenna panel, the PUSCH may be precoded with the $i^{th}$ precoding information and then sent.

Alternatively, in response to the terminal being capable of supporting an uplink UL TCI state, the indication information includes the SRI or the UL TCI state index, and in response to the terminal being incapable of supporting the uplink UL TCI state, the indication information includes the SRI.

In one embodiment, some terminals are capable of supporting uplink UL TCI states, while others are incapable of supporting uplink UL TCI states. For terminals being incapable of supporting uplink UL TCI states, sending the UL TCI state indexes to the terminals do not allow the terminals to determine the UL TCI states based on the UL TCI state indexes and send the UL TCI states in uplink, which causes waste of communication resources. Therefore, in this case, the SRI may be used as the indication information to avoid wasting communication resources.

In case that the terminal is capable of supporting the uplink UL TCI state, the base station may use the UL TCI state index as indication information, or use the SRI as indication information, which may be selected as needed.

The terminal may send capability information to the base station for the base station to determine whether the terminal supports the uplink UL TCI state.

Alternatively, the indication information includes the UL TCI state index, and a UL TCI state indicated by the UL TCI state index may be configured with, as a source reference signal at least one of:

a channel state information reference signal (CSI-RS), or an SRS.

In one embodiment, the UL TCI state index may indicate the UL TCI state, and the UL TCI state may use the CSI-RS as the source reference signal or the SRS as the source reference signal.

Alternatively, the UL TCI state is further configured to indicate a pathloss reference signal (pathloss RS) resource of a beam corresponding to the UL TCI state index.

In one embodiment, the UL TCI state index indicates the UL TCI state, and the UL TCI state indicates the pathloss RS resource of the beam corresponding to the UL TCI state index, such that the terminal may send the pathloss RS resource on the beam based on the pathloss RS resource for the base station to determine the path loss that needs to be compensated.

According to embodiments of the present disclosure, the UL TCI state may be configured with the CSI-RS as the source reference signal, or be configured with the SRS as the source reference signal, and the UL TCI state may include the pathloss RS resource on a basis of the CSI-RS as the reference signal, or include the pathloss RS resource on a basis of the SRS as the source reference signal.

Alternatively, in response to an uplink transmission of the terminal supporting a beam consistency, the UL TCI state indicated by the UL TCI state index is configured with the CSI-RS as the source reference signal, or is configured with the SRS as the source reference signal.

In one embodiment, since the terminal sending information to the base station belongs to uplink, and the CSI-RS belongs to the downlink signal, the terminal may be configured with the SRS as the source reference signal for the UL TCI state. In case that the uplink transmission of the terminal supports the beam consistency, the downlink CSI-RS may be used as the reference signal for the UL TCI state.

Alternatively, in response to an uplink transmission of the terminal not supporting a beam consistency, the UL TCI state indicated by the UL TCI state index is configured with the SRS as the source reference signal.

In one embodiment, in case that the uplink transmission of the terminal does not support the beam consistency, the CSI-RS belonging to the downlink signal cannot be used as a source reference signal for the UL TCI state, and only the SRS may be used as the source reference signal for the UL TCI state.

Figure 3:
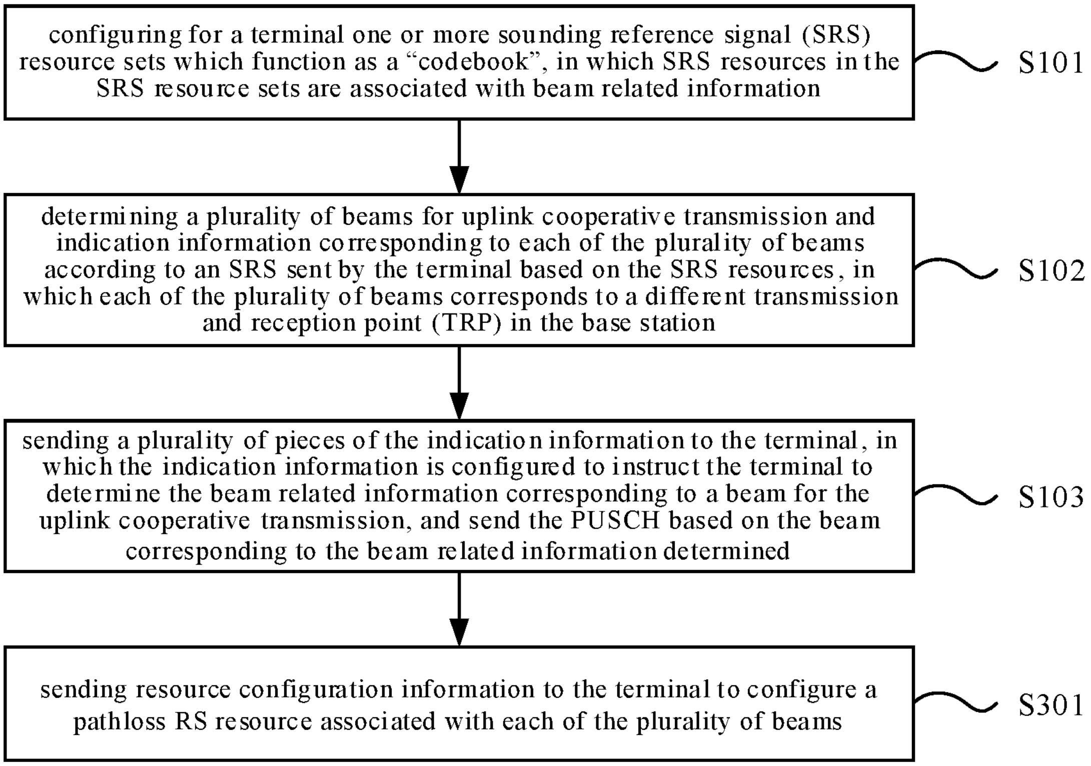
FIG. 3 is a flowchart illustrating a method for indicating a PUSCH according to still another embodiment of the present disclosure.

FIG. 3 is a flowchart illustrating a method for indicating a PUSCH according to still another embodiment of the present disclosure. As shown in FIG. 3, in response to the UL TCI state being not configured to indicate a pathloss RS resource of a beam corresponding to the UL TCI state index, the method further includes as follows.

In step S301, resource configuration information is sent to the terminal to configure a pathloss RS resource associated with each of the beams.

In one embodiment, in case that the UL TCI state is not configured to indicate the pathloss RS resource of the beam corresponding to the UL TCI state index, the base station may send the resource configuration information to the terminal to configure the pathloss RS resource associated with each of the beams, so that the terminal may send the pathloss RS on the beam based on the pathloss RS resource, so as to allow the base station to determine the path loss that needs to be compensated.

In one embodiment, the resource configuration information may be indicated by a medium access control layer control element (MAC CE).

Figure 4:
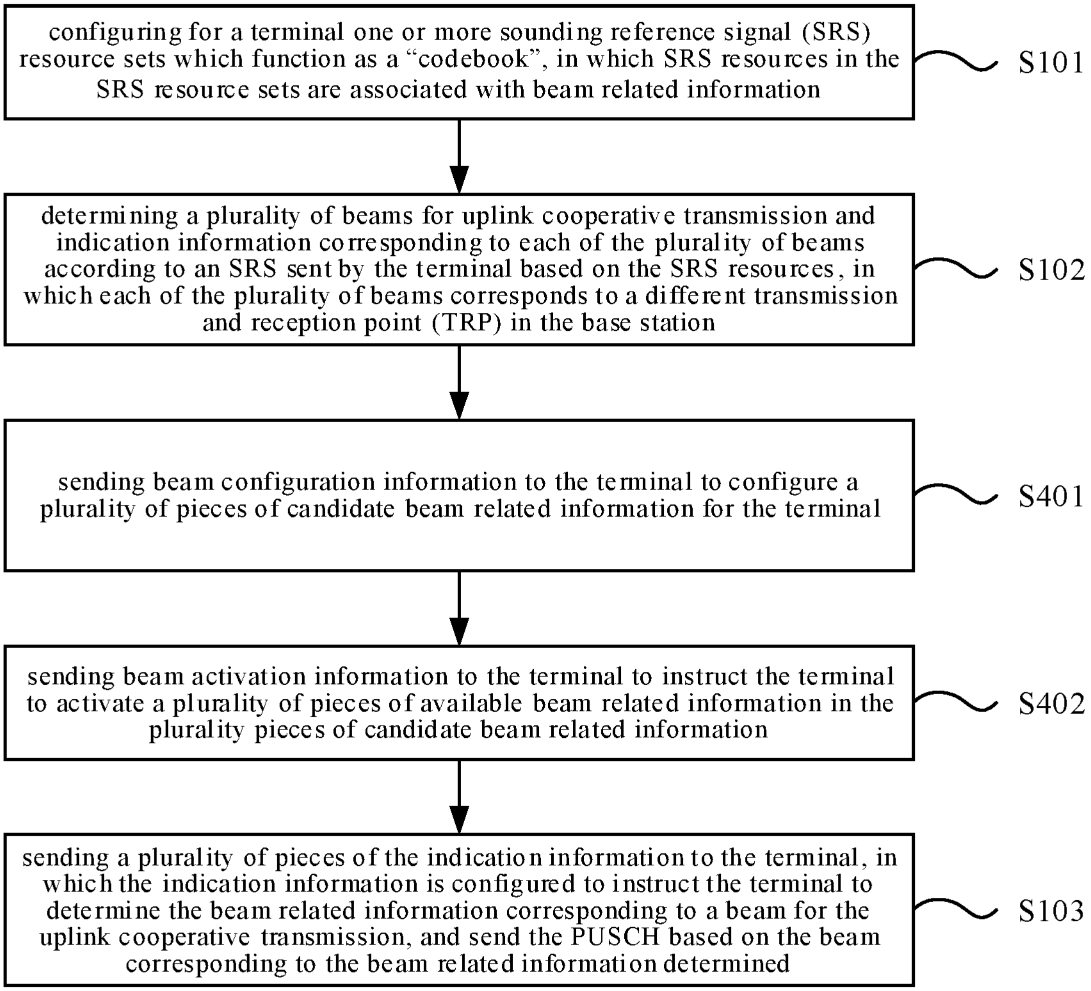
FIG. 4 is a flowchart illustrating a method for indicating a PUSCH according to still another embodiment of the present disclosure.

FIG. 4 is a flowchart illustrating a method for indicating a PUSCH according to yet another embodiment of the present disclosure. As shown in FIG. 4, the indication information includes the UL TCI state index, and the method further include as follows.

In step S401, beam configuration information (such as, carried in radio resource control RRC information) is sent to the terminal to configure a plurality of pieces of candidate beam related information for the terminal.

In step S402, beam activation information (such as, carried in MAC CE) is sent to the terminal to instruct the terminal to activate a plurality of pieces of available beam related information in the plurality of pieces of candidate beam related information.

The UL TCI state index is configured to instruct the terminal to determine the beam related information for uplink cooperative multi-TRP based transmission in the plurality of pieces of available beam related information.

In one embodiment, since the number of pieces of candidate beam related information may be large, such as 64, if the indication information is directly used for indication, excessive bits need to be occupied. Therefore, in some embodiments of the present disclosure, a plurality of pieces of candidate beam related information may be first configured via the beam configuration information, and the beam activation information is further sent to the terminal to activate a plurality of pieces of available beam related information in the plurality of pieces of candidate beam-related information. For example, if 8 out of 64 pieces of candidate beam related information are activated as the available beam related information, for each of the beams used for the uplink cooperative transmission, only indication information that indicates 8 situations is used for indication, and only 3 bits need to occupy for the 8 situations, which is conducive to reducing the number of bits required for indication information and saves communication resources.

Alternatively, the UL TCI state index is in one-to-one correspondence with the SRS resource.

In one embodiment, the UL TCI state index is in one-to-one correspondence with the beam related information, that is, each UL TCI state index may independently indicate one piece of the beam related information. Specifically, the UL TCI state may be indicated via the UL TCI state index, and the reference signal in the UL TCI state is the SRS. Therefore, the SRS resource corresponding to the reference signal SRS in the UL TCI state further corresponds to the beam related information, i.e., the beam related information indicated by the UL TCI state index.

As shown in Table 1, 8 pieces of available beam related information are activated, and meanings of UL TCI states from A0 to A7 may be set as needed.

The base station may send one or more pieces of indication information to the terminal, that is, the base station may send one or more UL TCI state indexes to the terminal. For example, the base station send two UL TCI state indexes to the terminal, which are 0 and 1 respectively, and it may be determined that the SRS resources corresponding to the two UL TCI states indicated are SRS0 and SRS3, respectively according to the two UL TCI state indexes, and thus the beam related information corresponding to the two SRS resources, i.e., SRS0 and SRS3, are 2 pieces of the beam related information indicated by the base station through the indication information.

TABLE 1

| UL TCI state index | UL TCI state | SRS resource |
|---|---|---|
| 0 | A0 | SRS0 |
| 1 | A1 | SRS3 |
| 2 | A2 | SRS5 |
| 3 | A3 | SRS6 |
| 4 | A4 | SRS9 |
| 5 | A5 | SRS11 |
| 6 | A6 | SRS14 |
| 7 | A7 | SRS15 |

Alternatively, the UL TCI state index corresponds to a single piece of the beam related information and/or a plurality of pieces of the beam related information.

In one embodiment, the UL TCI state index may correspond to a single SRS piece of the beam related information and/or a plurality of pieces of the beam related information, that is, the UL TCI state index may independently indicate one piece of the beam related information, and the UL TCI state index may also indicate a plurality of pieces of the beam related information.

Specifically, the UL TCI state may be indicated by the UL TCI state index. The reference signal in the UL TCI state is the SRS, and the beam related information corresponding to the SRS resource that corresponds to the reference signal SRS in the UL TCI state is the beam related information indicated by the UL TCI state index.

As shown in Table 2, 8 pieces of available beam related information are activated, and meanings of UL TCI states from A0 to A7 may be set as needed.

The base station may send one or more pieces of indication information to the terminal, that is, the base station may send one or more UL TCI state indexes to the terminal. For example, the base station sends two UL TCI state indexes to the terminal, which are 0 and 1 respectively, and it may be determined that the SRS resources corresponding to the two UL TCI states indicated are SRS0 and SRS1, respectively according to the two UL TCI state indexes, and thus the beam related information corresponding to the two SRS resources, i.e., SRS0 and SRS1, are two pieces of the beam related information indicated by the base station through the indication information.

For example, the base station sends two UL TCI state indexes to the terminal, which are 3 respectively, and it may be determined that the SRS resources corresponding to the two UL TCI states indicated are SRS1 and SRS2, respectively according to the two UL TCI state indexes, and thus the beam related information corresponding to the two SRS resources, i.e., SRS1 and SRS2, is two pieces of the beam related information indicated by the base station through the indication information.

TABLE 2

| UL TCI state index | UL TCI state | SRS resource |
|---|---|---|
| 0 | A0 | SRS0 |
| 1 | A1 | SRS1 |
| 2 | A2 | SRS2 |
| 3 | A3 | SRS1, SRS2 |
| 4 | A4 | SRS2, SRS5 |
| 5 | A5 | SRS3, SRS6 |
| 6 | A6 | SRS1, SRS8 |
| 7 | A7 | SRS4, SRS7, SRS9 |

In this embodiment, the UL TCI state index not only corresponds to a single piece of beam related information, but also corresponds to a plurality of pieces of beam related information, and the single piece of beam related information corresponding to the UL TCI state index may be included in the corresponding plurality of pieces of beam related information. On a basis of this, the base station is allowed to provide a fallback indication. For example, the UL TCI state index is set as 4 to indicate the beam related information corresponding to the two SRS resources of SRS2 and SRS5, respectively. However, if it is determined that the SRS sent via the SRS resource of SRS5 does not meet the requirements for signal strength, that is, the signal sent by the antenna panel determined by the terminal based on the beam related information corresponding to the SRS resource of SRS5 does not meet the requirements, the fallback indication may be that the UL TCI state index is set as 2, which only indicates the beam related information corresponding to the SRS resource of SRS2.

Figure 5:
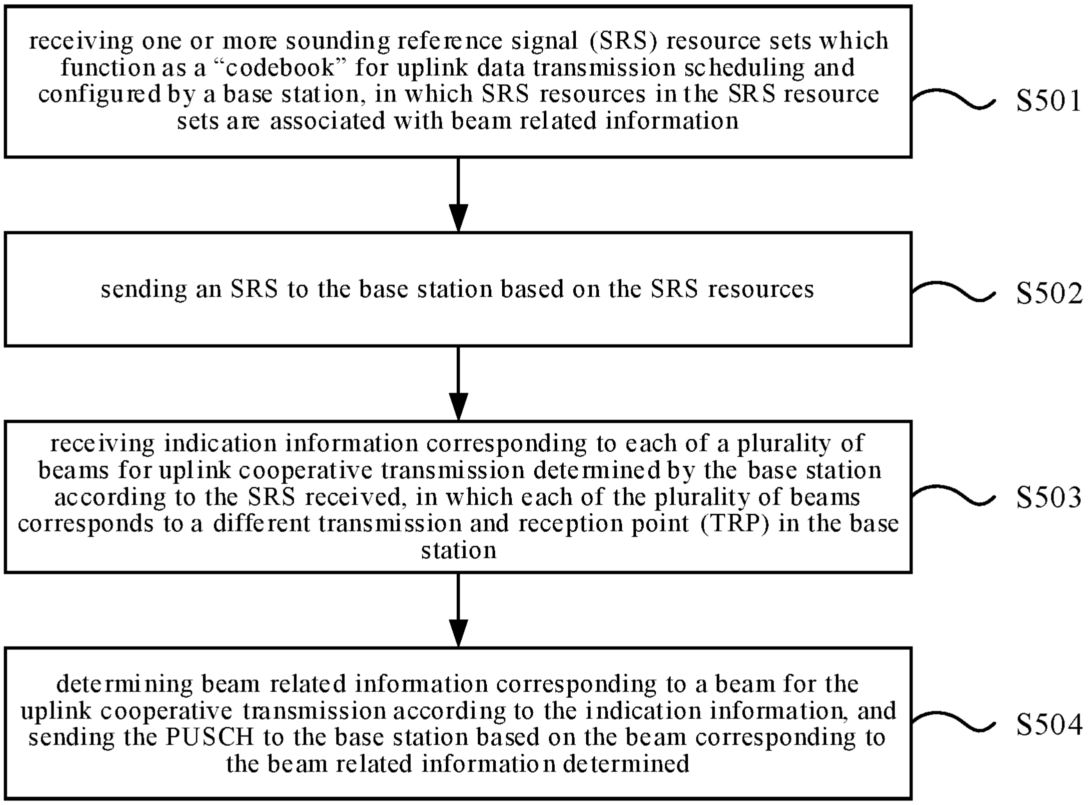
FIG. 5 is a flowchart illustrating a method for sending a PUSCH according to an embodiment of the present disclosure.

FIG. 5 is a flowchart illustrating a method for sending a PUSCH according to an embodiment of the present disclosure. The method for sending the PUSCH shown in embodiments may be performed by a terminal, and the terminal includes, but is not limited to, an electronic device such as a mobile phone, a tablet computer, a wearable device, a sensor, an Internet of Things device, and the like. The terminal may be used as a user device communicated with a base station. The base station includes, but is not limited to, a 4G base station, a 5G base station and a 6G base station. In one embodiment, the base station may be a base station suitable for the method for indicating the PUSCH in any one of the above embodiments.

As shown in FIG. 5, the method for sending the PUSCH may include as follows.

In step S501, one or more sounding reference signal (SRS) resource sets which function as a "codebook" for uplink data transmission scheduling and configured by a base station is received, and SRS resources in the SRS resource sets are associated with beam related information.

In step S502, an SRS is sent to the base station based on the SRS resources.

In step S503, indication information corresponding to each of a plurality of the beams for uplink cooperative transmission determined by the base station according to the SRS received is received. Each of the beams corresponds to a different transmission and reception point (TRP) in the base station.

In step S504, beam related information corresponding to a beam for uplink cooperative transmission is determined according to the indication information, and the PUSCH is sent to the base station based on the beam corresponding to the beam related information determined.

In one embodiment, precoding may include precoding based on codebooks and precoding based on non-codebooks. Embodiments in the present disclosure are applied in precoding scenarios based on the codebooks.

One or more SRS resource sets are configured with a codebook usage for the terminal, the SRS resources in the sets are associated with the beam related information. The beam related information may be spatial relation information (SpatialRelationInfo) or other information associated with the beam.

After receiving the SRS resource sets, the terminal may determine the beam related information associated with each of the SRS resources, and determine the beam corresponding to the SRS resource based on the beam related information. In case of sending the SRS based on the SRS resource, specifically on the SRS resource, the SRS is sent via the beam corresponding to the SRS resource.

For example, if a plurality of antenna panels are provided in the terminal, and different antenna panels correspond to different beams (different beams may have different beam directions), the terminal may determine the antenna panel corresponding to the beam associated with the SRS resource, and send the SRS on the SRS resource via the antenna panel corresponding to the SRS.

On a basis of this, the terminal may send the SRS to the base station via the plurality of beams on the plurality of SRS resources. After the base station receives the SRS, the base station may detect an uplink channel based on the SRS received to determine a plurality of beams suitable for cooperative transmission of the plurality of the antenna panels in the terminal. For example, signal strength information of the SRS received may be detected to determine the beam associated with the SRS resource where a channel strength is greater than a preset strength value, which is suitable for cooperative transmission of the plurality of the antenna panels in the terminal.

In order to indicate a plurality of beams to the terminal, the base station may further determine indication information corresponding to each of the beams. Each of the beams corresponds to a different transmission and reception point (TRP) in the base station, and the base station may send the indication information to the terminal. The indication information may indicate the terminal to determine the beam related information corresponding to the beam used for uplink cooperative transmission, and send the PUSCH based on the beam corresponding to the beam related information determined.

After the terminal receives a plurality of pieces of the indication information, the terminal may determine the beam related information corresponding to the beam that is used for uplink cooperative transmission and corresponds to the indication information, and send the PUSCH based on the beam corresponding to the beam related information determined. Specifically, the beam for uplink cooperative transmission and the antenna panel corresponding to each of the beams may be determined according to the beam related information, and the PUSCH is sent to the base station on the corresponding beam via the plurality of the antenna panels.

On a basis of this, the base station may determine a plurality of the beams used for cooperative transmission and indication information corresponding to each beam, thus indicating the terminal via a plurality of indications corresponding to the plurality of the beams. In this way, the terminal may determine the plurality of the beams used for cooperative transmission and the antenna panels corresponding to the plurality of the beams according to the indication information, thus performing cooperative transmission via the plurality of the antenna panels to meet the requirements of services which need improved transmission of the PUSCH. The services include, but are not limited to, ultra-reliable and low latency communication (URLLC) services.

Figure 6:
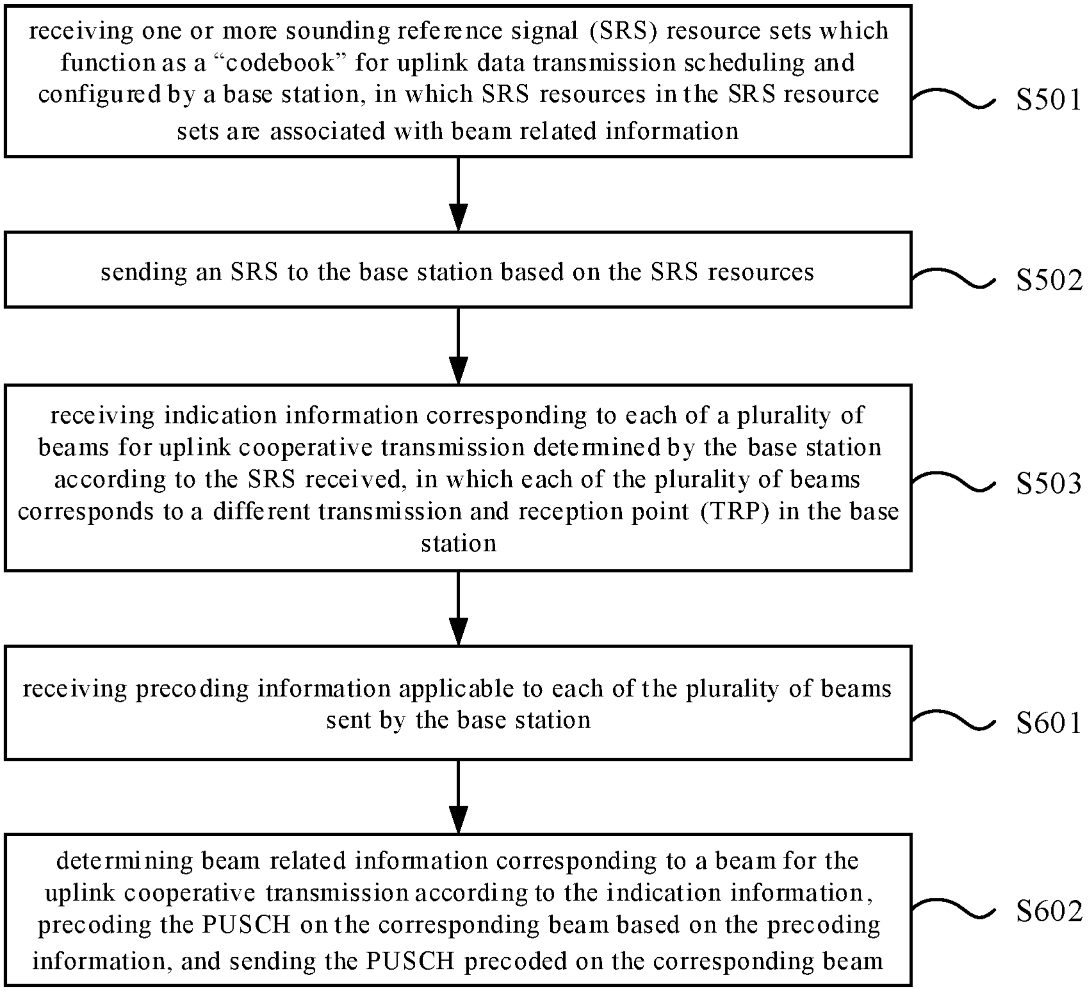
FIG. 6 is a flowchart illustrating a method for sending a PUSCH according to another embodiment of the present disclosure.

FIG. 6 is a flowchart illustrating a method for sending a PUSCH according to another embodiment of the present disclosure. As shown in FIG. 6, the method further includes as follows.

In step S601, precoding information applicable to each of the plurality of beams sent by the base station is received.

Sending the PUSCH to the base station based on the beam corresponding to the beam related information determined includes as follows.

In step S602, the PUSCH on the corresponding beam is precoded based on the precoding information, and the PUSCH precoded is sent on the corresponding beam.

In one embodiment, the base station may detect an uplink channel of the SRS received and determine the precoding information applicable to each of the beams. The precoding information includes, but is not limited to, precoding matrix indication information TPMI and rank indication information RI. Determining the precoding information includes, but is not limited to, a singular value decomposition (SDV) algorithm, an equation-based eigenvalue solving algorithm, a maximum ||HW|| selection algorithm, and the like, and a specific selection may be made as needed, which is not limited in the present disclosure.

A plurality of pieces of precoding information corresponding to a plurality of beams may be sent to the terminal. The terminal may precode the PUSCH on the beam corresponding to the precoding information according to the precoding information, and send the PUSCH precoded on the beam corresponding to the precoding information.

Alternatively, the indication information includes at least one of:

an SRS resource indication identifier (SRI) or an uplink transmission configuration indication (UL TCI) state index.

In one embodiment, the indication information sent by the base station to the terminal may be the SRI or the UL TCI state index.

In case that the indication information is the SRI, the terminal may determine an SRI resource indicated by the SRI, for example, determine the SRS resource indicated by the SRI in the SRS resource sets, so as to determine the beam related information associated with the SRS resource.

In case that the indication information is the UL TCI state index, the terminal may determine a UL TCI state indicated by the UL TCI state index, and then determine the beam related information corresponding to the beam for uplink cooperative transmission corresponding to a reference signal in the UL TCI state. The reference signal may be the SRS or the CSI-RS, which may be selected as needed.

In a related art, a downlink TCI state may be used to indicate the beam for downlink transmission. In an embodiment of the present disclosure, the UL TCI state index is used as an indication to indicate the beam for uplink transmission, so as to make the indication manner for the uplink be more consistent with the indication manner for the downlink, which is conducive to simplifying the indication logic and reducing the complexity of indication operations of the base station.

In one embodiment, for example, the indication information is the SRI, the base station sends m SRIs to the terminal, where m is the number of the antenna panels for uplink cooperative transmission supported by the terminal. The base station may preconstruct m candidate sets, i.e., SRS1 to SRSm, and the base station may indicate the SRI in the candidate set SRSi through $\log_2(N_{SRSi})$ bits, where $N_{SRSi}$ represents the number of SRIs in the candidate set SRSi, and $1 \le i \le m$.

In addition, for each SRS resource indicated by the SRI, the base station may calculate precoding information. For example, for the m SRS resources indicated by the m SRIs, m pieces of the precoding information may be calculated. For example, the precoding information includes TPMI and RI, m TPMIs and m RIs may be calculated. The $i^{th}$ precoding information corresponds to the SRS resource indicated by the $i^{th}$ SRI, i.e., corresponds to the antenna panel and the beam corresponding to the SRS resource. That is, in case of sending the PUSCH via an $i^{th}$ antenna panel, the PUSCH may be precoded with the $i^{th}$ precoding information and then sent.

Alternatively, in response to the terminal being capable of supporting an uplink UL TCI state, the indication information includes the SRI or the UL TCI state index, and in response to the terminal being incapable of supporting the uplink UL TCI state, the indication information includes the SRI.

In one embodiment, some terminals are capable of supporting uplink UL TCI states, while others are incapable of supporting uplink UL TCI states. For terminals being incapable of supporting uplink UL TCI states, sending the UL TCI state indexes to the terminals do not allow the terminals to determine the UL TCI states based on the UL TCI state indexes and send the UL TCI states in uplink, which causes waste of communication resources. Therefore, in this case, the SRI may be used as the indication information to avoid wasting communication resources.

In case that the terminal is capable of supporting an uplink UL TCI state, the base station may use the UL TCI state index as indication information, or use the SRI as indication information, which may be selected as needed.

The terminal may send capability information to the base station for the base station to determine whether the terminal supports the uplink UL TCI state.

Figure 7:
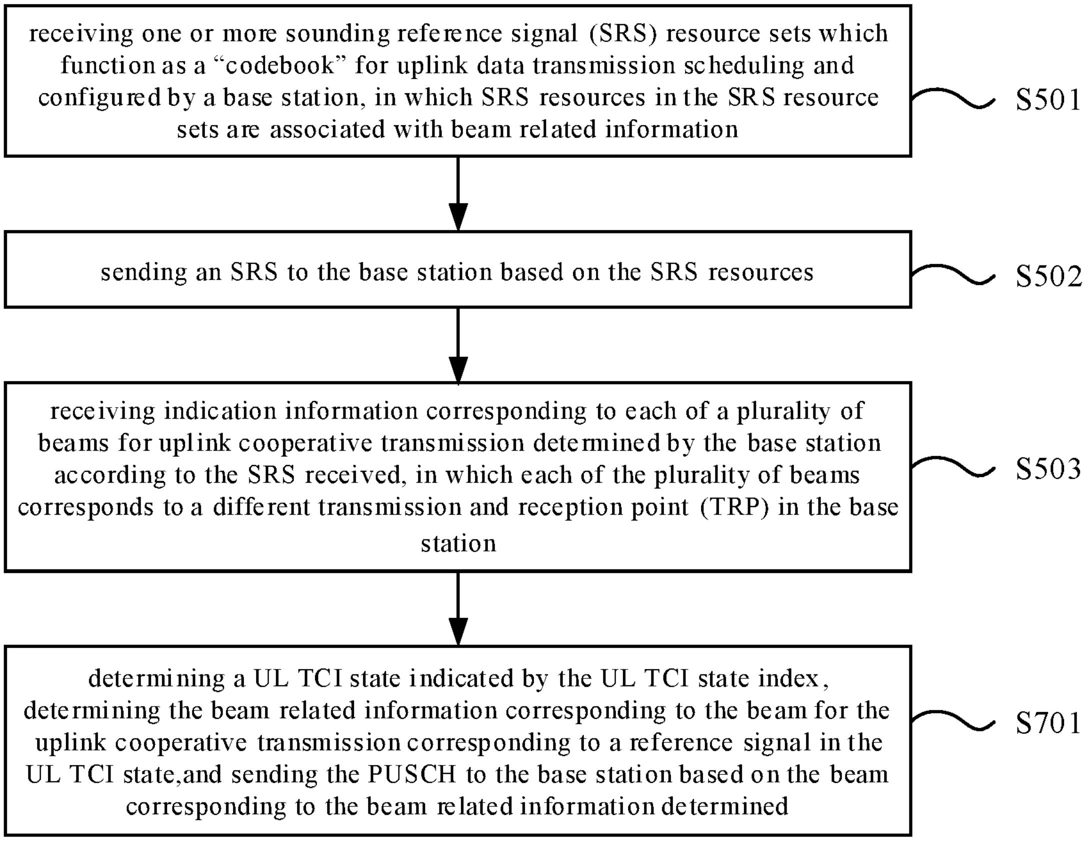
FIG. 7 is a flowchart illustrating a method for sending a PUSCH according to still another embodiment of the present disclosure.

FIG. 7 is a flowchart illustrating a method for sending a PUSCH according to still another embodiment of the present disclosure. As shown in FIG. 7, the indication information includes the UL TCI state index, and determining the beam related information corresponding to the beam for uplink cooperative transmission according to the indication information includes as follows.

In step S701, the UL TCI state indicated by the UL TCI state index is determined, and the beam related information corresponding to the beam for uplink cooperative transmission corresponding to the reference signal in the UL TCI state is determined.

In one embodiment, the base station may indicate the UL TCI state via the UL TCI state index, and the reference signal in the UL TCI state is the SRS. Therefore, the beam related information corresponding to the SRS resource corresponding to the reference signal SRS in the UL TCI state is the beam related information indicated by the UL TCI state index. Therefore, the terminal may determine the UL TCI state indicated by the UL TCI state index, and then determine the beam related information corresponding to the beam used for uplink cooperative transmission corresponding to the reference signal in the UL TCI state.

Figure 8:
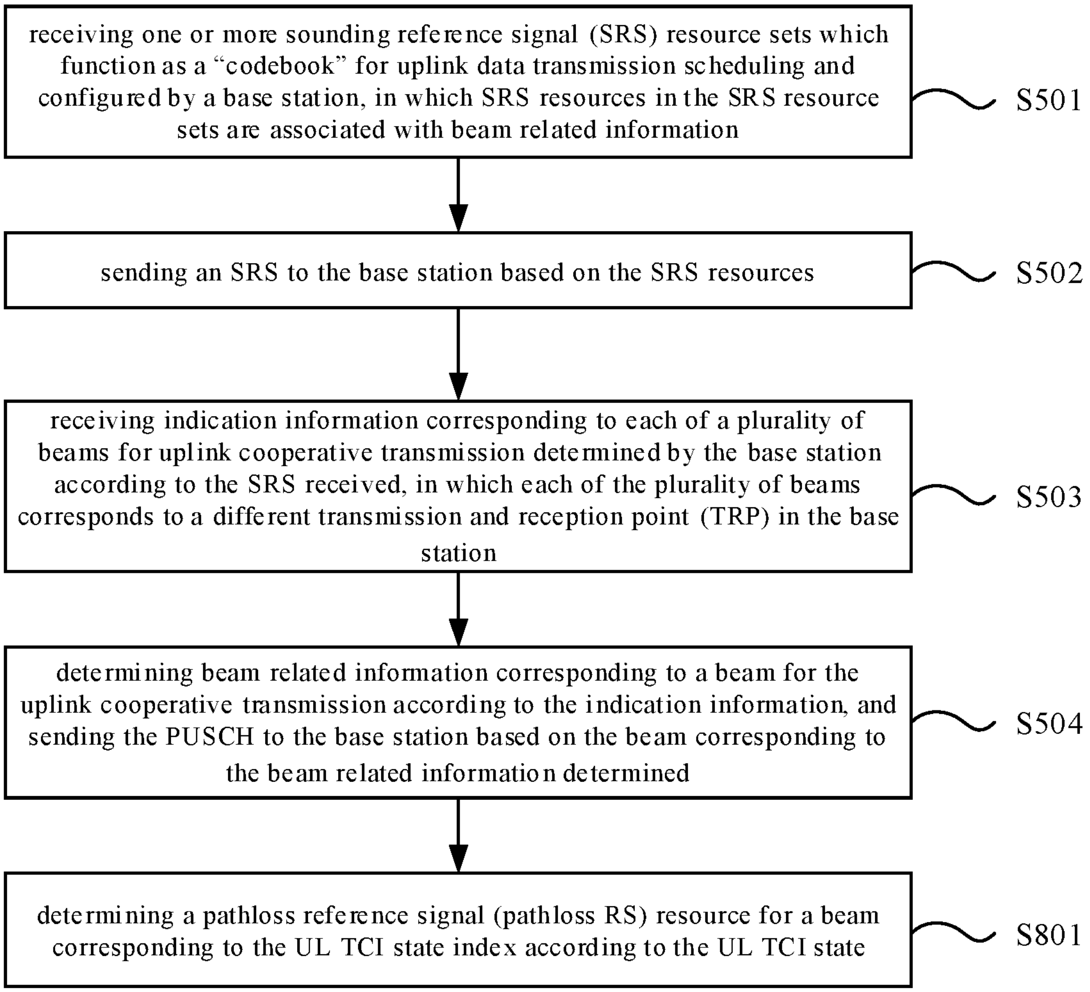
FIG. 8 is a flowchart illustrating a method for sending a PUSCH according to still another embodiment of the present disclosure.

FIG. 8 is a flowchart illustrating a method for sending a PUSCH according to still another embodiment of the present disclosure. As shown in FIG. 8, the method further includes as follows.

In step S801, the pathloss reference signal (pathloss RS) resource of the beam corresponding to the UL TCI state index is determined according to the UL TCI state.

In one embodiment, the UL TCI state index indicates the UL TCI state, and the UL TCI state indicates the pathloss RS resource of the beam corresponding to the UL TCI state index, such that the terminal may send the pathloss RS resource on the beam based on the pathloss RS resource for the base station to determine the path loss that needs to be compensated.

According to embodiments of the present disclosure, the UL TCI state may be configured with the CSI-RS as the source reference signal, or be configured with the SRS as the source reference signal, and the UL TCI state may include the pathloss RS resource on a basis of the CSI-RS as the source reference signal, or include the pathloss RS resource on a basis of the SRS as the source reference signal.

Alternatively, the reference signal in the UL TCI state includes at least one of:

a channel state information reference signal (CSI-RS) or the SRS.

In one embodiment, the UL TCI state index may indicate the UL TCI state, and the UL TCI state may be configured with the CSI-RS as the source reference signal or the SRS as the source reference signal.

Alternatively, in response to an uplink transmission of the terminal supporting a beam consistency, a reference signal in the UL TCI state includes CSI-RS or SRS.

In one embodiment, since the terminal sending information to the base station belongs to uplink, and the CSI-RS belongs to the downlink signal, the terminal may use the SRS as the source reference signal for the UL TCI state. In case that the uplink transmission of the terminal supports the beam consistency, the downlink CSI-RS may be used as the source reference signal for the UL TCI state.

Alternatively, in response to an uplink transmission of the terminal not supporting a beam consistency, the reference signal in the UL TCI state includes the SRS.

In one embodiment, in case that the uplink transmission of the terminal does not support the beam consistency, the CSI-RS belonging to the downlink signal cannot be used as a source reference signal for the UL TCI state, and only the SRS may be used as the source reference signal for the UL TCI state.

Figure 9:
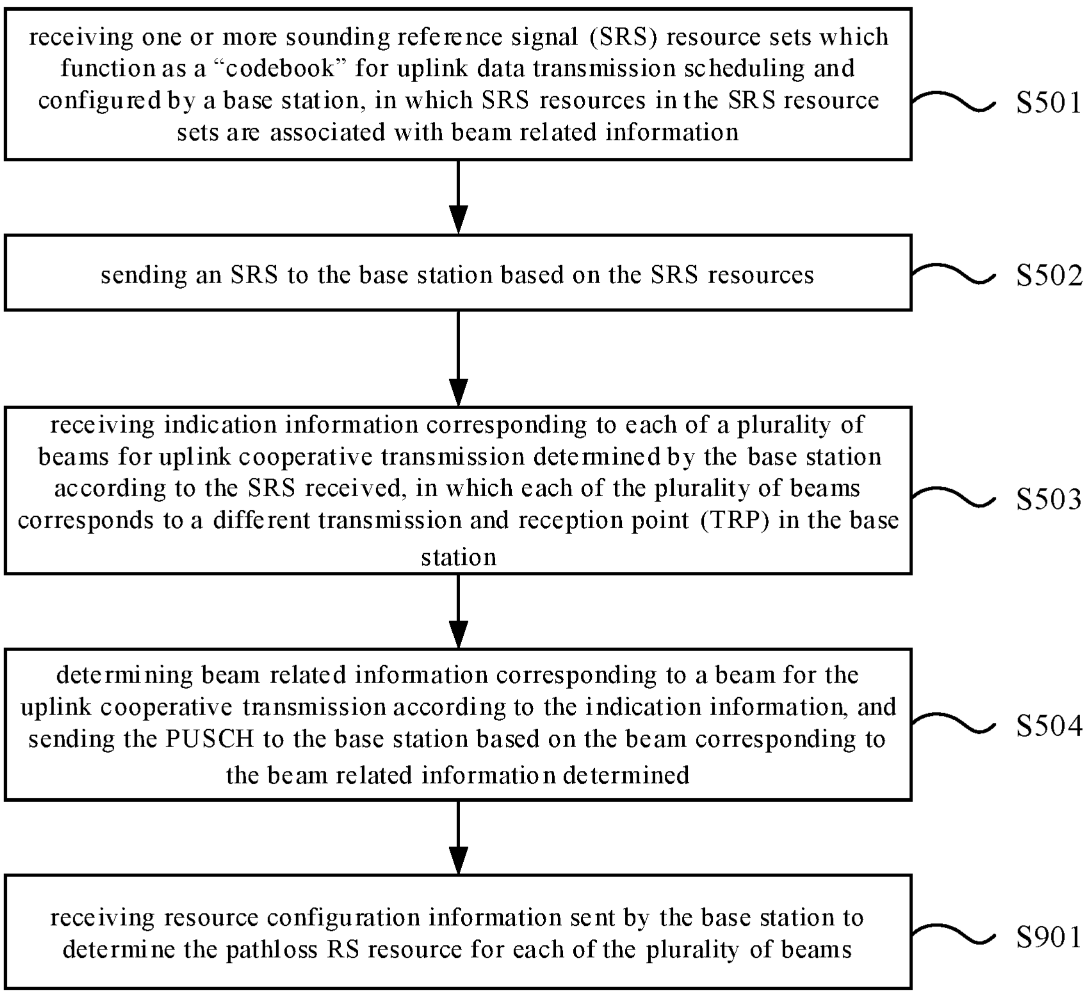
FIG. 9 is a flowchart illustrating a method for sending a PUSCH according to still another embodiment of the present disclosure.

FIG. 9 is a flowchart illustrating a method for sending a PUSCH according to still another embodiment of the present disclosure. As shown in FIG. 9, the method further includes as follows.

In step S901, resource configuration information send by the terminal is received to determine a pathloss RS resource in each of the beams.

In one embodiment, in case that the UL TCI state is not configured to indicate the pathloss RS resource of the beam corresponding to the UL TCI state index, the base station may send the resource configuration information to the terminal to configure the pathloss RS resource associated with each of the beams, so that the terminal may send the pathloss RS on the beam based on the pathloss RS resource, so as to allow the base station to determine the path loss that needs to be compensated.

In one embodiment, the resource configuration information may be indicated by a medium access control layer control element (MAC CE).

Figure 10:
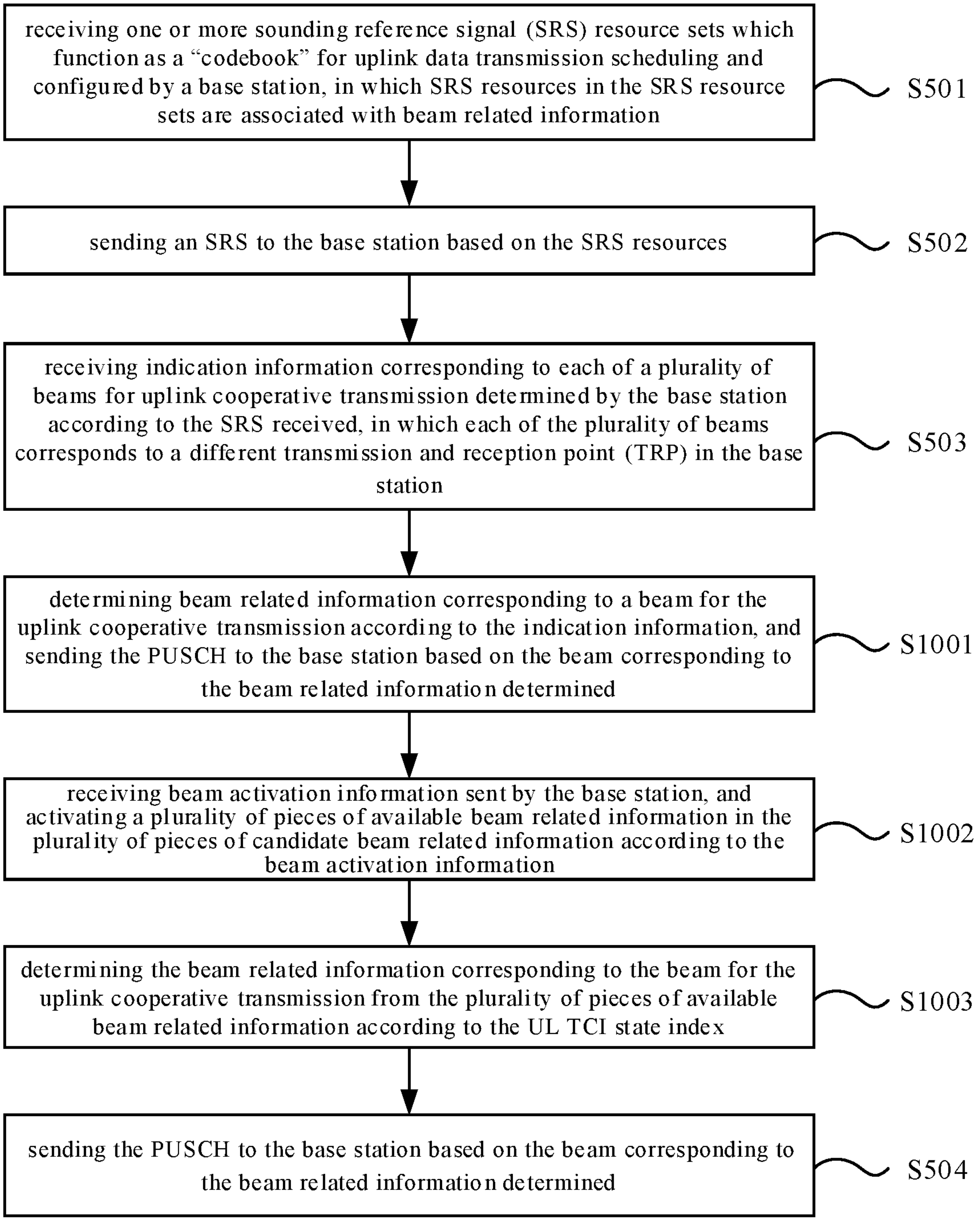
FIG. 10 is a flowchart illustrating a method for sending a PUSCH according to still another embodiment of the present disclosure.

FIG. 10 is a flowchart illustrating a method for sending a PUSCH according to yet another embodiment of the present disclosure. As shown in FIG. 10, the indication information includes the UL TCI state index, and determining the beam related information corresponding to the beam for uplink cooperative transmission according to the indication information includes as follows.

In step S1001, beam configuration information sent by the base station is received to determine a plurality of pieces of candidate beam related information according to the beam configuration information.

In step S1002, beam activation information sent by the base station is received, a plurality of pieces of available beam related information are activated in the plurality of pieces of candidate beam-related information according to the beam activation information.

In step S1003, the beam related information corresponding to the beam for uplink cooperative transmission is determined in the available beam related information according to the UL TCI state index.

In one embodiment, since the number of pieces of candidate beam related information may be large, such as 64, if the indication information is directly used for indication, excessive bits need to be occupied. Therefore, in some embodiments of the present disclosure, a plurality of pieces of candidate beam related information may be first configured via the beam configuration information, and the beam activation information is further sent to the terminal to activate a plurality of pieces of available beam related information in the plurality of pieces of candidate beam-related information. For example, if 8 out of 64 pieces of candidate beam related information are activated as the available beam related information, for each of the beams used for the uplink cooperative transmission, only indication information that indicates 8 situations is used for indication, and only 3 bits need to occupy for the 8 situations, which is conducive to reducing the number of bits required for indication information and saves communication resources.

Alternatively, the UL TCI state index is in one-to-one correspondence with the SRS resource.

In one embodiment, the UL TCI state index is in one-to-one correspondence with the beam related information, that is, each UL TCI state index may independently indicate one piece of the beam related information. Specifically, the UL TCI state may be indicated via the UL TCI state index, and the reference signal in the UL TCI state is the SRS. Therefore, the SRS resource corresponding to the reference signal SRS of the UL TCI state further corresponds to the beam related information, i.e., the beam related information indicated by the UL TCI state index.

As shown in Table 1, 8 pieces of available beam related information are activated, and meanings of UL TCI states from A0 to A7 may be set as needed.

The base station may send one or more pieces of indication information to the terminal, that is, the base station may send one or more UL TCI state indexes to the terminal. For example, the base station send two UL TCI state indexes to the terminal, which are 0 and 1 respectively, and it may be determined that the SRS resources corresponding to the two UL TCI states indicated are SRS0 and SRS3, respectively according to the two UL TCI state indexes, and thus the beam related information corresponding to the two SRS resources, i.e., SRS0 and SRS3, are 2 pieces of the beam related information indicated by the base station via the indication information.

Alternatively, the UL TCI state index corresponds to a single piece of the beam related information and/or a plurality of pieces of the beam related information.

In one embodiment, the UL TCI state index may correspond to a single SRS piece of the beam related information and/or a plurality of pieces of the beam related information, that is, the UL TCI state index may independently indicate one piece of the beam related information, and the UL TCI state index may also indicate a plurality of pieces of the beam related information.

Specifically, the UL TCI state may be indicated by the UL TCI state index. The reference signal in the UL TCI state is the SRS, and the beam related information corresponding to the SRS resource that corresponds to the reference signal SRS in the UL TCI state is the beam related information indicated by the UL TCI state index.

As shown in Table 2, 8 pieces of available beam related information are activated, and meanings of UL TCI states from A0 to A7 may be set as needed.

The base station may send one or more pieces of indication information to the terminal, that is, the base station may send one or more UL TCI state indexes to the terminal. For example, the base station sends two UL TCI state indexes to the terminal, which are 0 and 1 respectively, and it may be determined that the SRS resources corresponding to the two UL TCI states indicated are SRS0 and SRS1, respectively according to the two UL TCI state indexes, and thus the beam related information corresponding to the two SRS resources, i.e., SRS0 and SRS1, are two pieces of the beam related information indicated by the base station via the indication information.

For example, two UL TCI state indexes that are 3 are sent to the terminal, and thus it is may be determined that the SRS resources corresponding to the indicated UL TCI state are SRS1 and SRS2 according to the two UL TCI state indexes. Therefore, the beam related information corresponding to the two SRS resources, SRS1 and SRS2, is the beam related information indicated by the base station via the indication information.

In this embodiment, the UL TCI state index not only corresponds to a single piece of beam related information, but also corresponds to a plurality of pieces of beam related information, and the single piece of beam related information corresponding to the UL TCI state index may be included in the corresponding plurality of pieces of beam related information. On a basis of this, the base station is allowed to provide a fallback indication. For example, the UL TCI state index is set as 4 to indicate the beam related information corresponding to the two SRS resources of SRS2 and SRS5, respectively. However, if it is determined that the SRS sent via the SRS resource of SRS5 does not meet the requirements for signal strength, that is, the signal sent by the antenna panel determined by the terminal based on the beam related information corresponding to the SRS resource of SRS5 does not meet the requirements, the fallback indication may be that the UL TCI state index is set as 2, which only indicates the beam related information corresponding to the SRS resource of SRS2.

Corresponding to the above-mentioned embodiments of the method for indicating the PUSCH and the method for sending the PUSCH, the present disclosure provides embodiments of an apparatus for indicating a PUSCH and an apparatus for sending a PUSCH.

Figure 11:
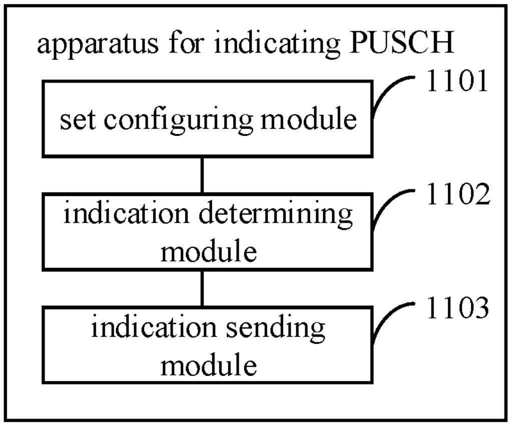
FIG. 11 is a block diagram illustrating an apparatus for indicating a PUSCH according to an embodiment of the present disclosure.

FIG. 11 is a block diagram illustrating an apparatus for indicating a PUSCH according to an embodiment of the present disclosure. The apparatus for indicating the PUSCH shown in embodiments may be performed by a base station, and the base station includes, but is not limited to, a 4G base station, a 5G base station and a 6G base station. The base station may communicate with a terminal that is used as a user device. The terminal may include, but is not limited to, an electronic device such as a mobile phone, a tablet computer, a wearable device, a sensor, an Internet of Things device, and the like. In one embodiment, the terminal may be a terminal suitable for an apparatus for sending a PUSCH in any one of the subsequent embodiments.

As shown in FIG. 11, the apparatus for indicating the PUSCH may include as follows.

A set configuring module 1101 is configured to configure for a terminal one or more sounding reference signal (SRS) resource sets which function as a “codebook”. The SRS resources in the SRS resource sets are associated with beam related information.

An indication determining module 1102 is configured to determine a plurality of beams for uplink cooperative transmission and indication information corresponding to each of the plurality of beams according to an SRS sent by the terminal based on the SRS resources. Each of the plurality of beams corresponds to a different transmission and reception point (TRP) in the base station.

An indication sending module 1103 is configured to send a plurality of pieces of the indication information to the terminal. The indication information is configured to instruct the terminal to determine the beam related information corresponding to a beam for the uplink cooperative transmission, and send the PUSCH based on the beam corresponding to the beam related information determined.

Figure 12:
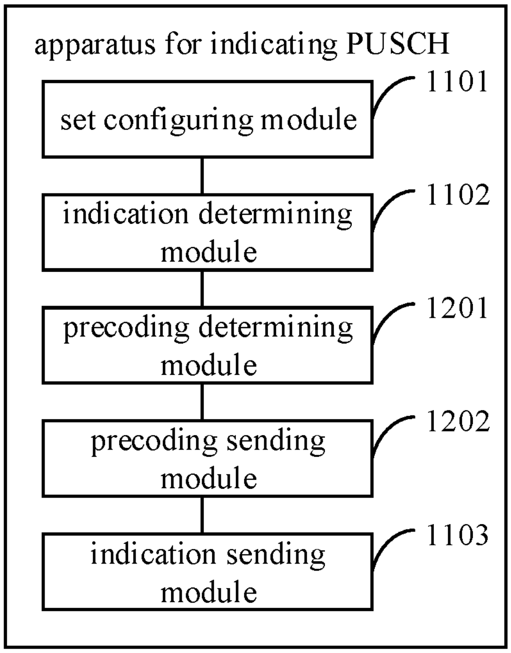
FIG. 12 is a block diagram illustrating an apparatus for indicating a PUSCH according to another embodiment of the present disclosure.

FIG. 12 is a block diagram illustrating an apparatus for indicating a PUSCH according to another embodiment of the present disclosure. As shown in FIG. 12, the method further includes as follows.

A precoding determining module 1201 is configured to determine precoding information applicable to each of the plurality of beams.

A precoding sending module 1202 is configured to send the precoding information to the terminal.

Alternatively, the indication information includes at least one of:

an SRS resource indication identifier (SRI) or an uplink transmission configuration indication (UL TCI) state index.

Alternatively, in response to the terminal being capable of supporting an uplink UL TCI state, the indication information includes the SRI or the UL TCI state index; and in response to the terminal being incapable of supporting the uplink UL TCI state, the indication information comprises the SRI.

Alternatively, the indication information includes the UL TCI state index, and a UL TCI state indicated by the UL TCI state index is configured with as a source reference signal at least one of:

the channel state information reference signal (CSI-RS), or the SRS.

Alternatively, the UL TCI state is further configured to indicate a pathloss reference signal (pathloss RS) resource of a beam corresponding to the UL TCI state index.

Alternatively, in response to an uplink transmission of the terminal supporting a beam consistency, the UL TCI state indicated by the UL TCI state index is configured with the CSI-RS as the source reference signal, or is configured with the SRS as the source reference signal.

Alternatively, in response to an uplink transmission of the terminal not supporting a beam consistency, the UL TCI state indicated by the UL TCI state index is configured with the SRS as the source reference signal.

Figure 13:
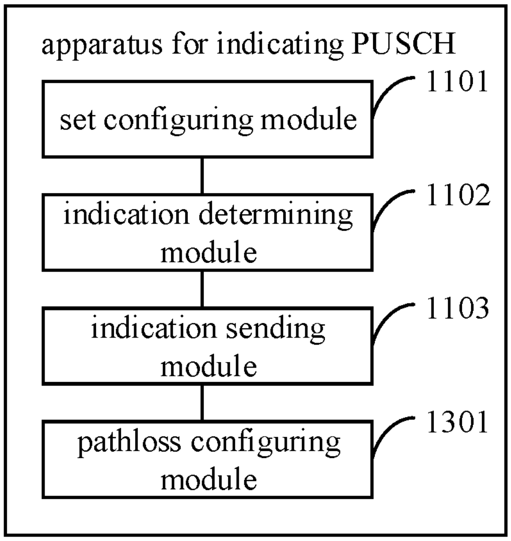
FIG. 13 is a block diagram illustrating an apparatus for indicating a PUSCH according to still another embodiment of the present disclosure.

FIG. 13 is a block diagram illustrating an apparatus for indicating a PUSCH according to still another embodiment of the present disclosure. As shown in FIG. 13, in response to the UL TCI state being not configured to indicate a pathloss RS resource of a beam corresponding to the UL TCI state index, the apparatus further includes as follows.

The pathloss configuring module 1301 is configured to send resource configuration information to the terminal to configure a pathloss RS resource associated with each of the beams.

Figure 14:
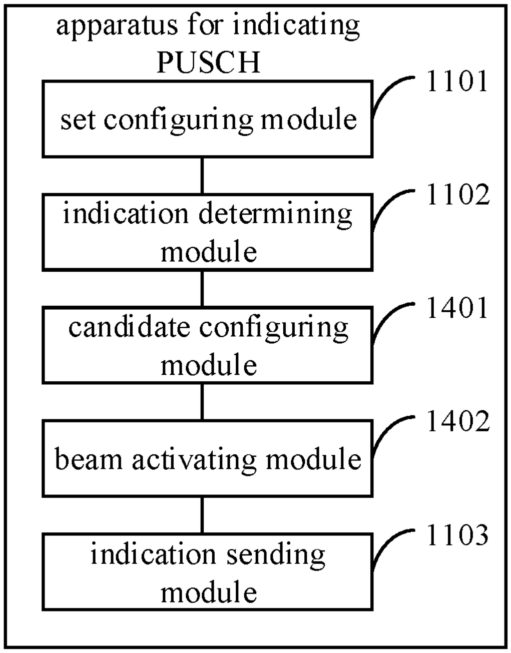
FIG. 14 is a block diagram illustrating an apparatus for indicating a PUSCH according to still another embodiment of the present disclosure.

FIG. 14 is a block diagram illustrating an apparatus for indicating a PUSCH according to still another embodiment of the present disclosure. As shown in FIG. 14, the indication information includes the UL TCI state index, and the apparatus further includes as follows.

A candidate configuring module 1401 is configured to send beam configuration information to the terminal to configure a plurality of pieces of candidate beam related information for the terminal.

A beam activating module 1402 is configured to send beam activation information to the terminal to instruct the terminal to activate a plurality of pieces of available beam related information in the plurality of pieces of candidate beam related information.

The UL TCI state index is configured to instruct the terminal to determine the beam related information corresponding to a beam for uplink cooperative transmission in the plurality of pieces of available beam related information.

Alternatively, the UL TCI state index is in one-to-one correspondence with the beam related information.

Alternatively, the UL TCI state index corresponds to a single piece of beam related information or a plurality of pieces of beam related information.

Figure 15:
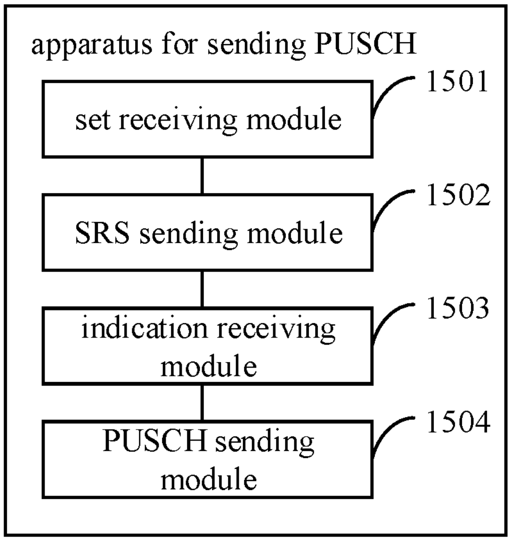
FIG. 15 is a block diagram illustrating an apparatus for sending a PUSCH according to an embodiment of the present disclosure.

FIG. 15 is a block diagram illustrating an apparatus for sending a PUSCH according to an embodiment of the present disclosure. The apparatus for sending the PUSCH shown in embodiments may be performed by a terminal, and the terminal includes, but is not limited to, an electronic device such as a mobile phone, a tablet computer, a wearable device, a sensor, an Internet of Things device, and the like. The terminal may be used as a user device communicated with a base station. The base station includes, but is not limited to, a 4G base station, a 5G base station and a 6G base station. In one embodiment, the base station may be a base station suitable for the apparatus for indicating the PUSCH in any one of the above embodiments.

As shown in FIG. 15, the apparatus for sending the PUSCH may include as follows.

A set receiving module 1501 is configured to receive one or more sounding reference signal (SRS) resource sets which function as a “codebook” for uplink data transmission scheduling and configured by a base station. SRS resources in the SRS resource sets are associated with beam related information.

An SRS sending module 1502 is configured to send an SRS to the base station based on the SRS resources.

An indication receiving module 1503 is configured to receive indication information corresponding to each of a plurality of the beams for uplink cooperative transmission determined by the base station according to the SRS received. Each of the beams corresponds to a different transmission and reception point (TRP) in the base station.

A PUSCH sending module 1504 is configured to determine beam related information corresponding to a beam for uplink cooperative transmission according to the indication information, and send the PUSCH to the base station based on the beam corresponding to the beam related information determined.

Figure 16:
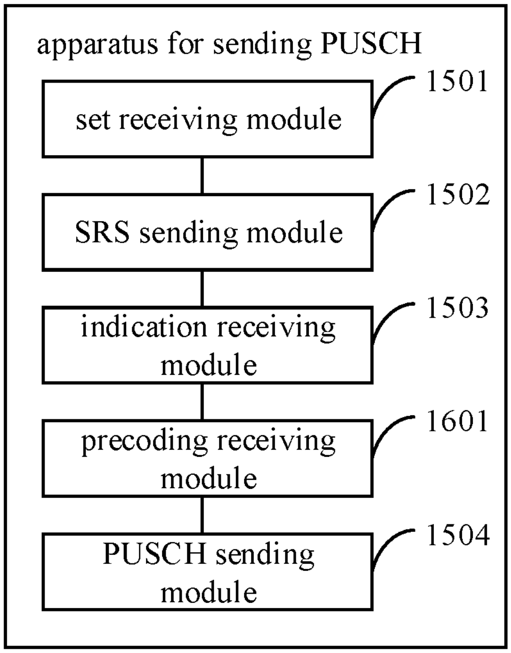
FIG. 16 is a block diagram illustrating an apparatus for sending a PUSCH according to another embodiment of the present disclosure.

FIG. 16 is a block diagram illustrating an apparatus for sending a PUSCH according to another embodiment of the present disclosure. As shown in FIG. 16, the apparatus includes as follows.

A precoding receiving module 1601 is configured to receive precoding information applicable to each of the plurality of beams sent by the base station.

The PUSCH sending module is configured to precode the PUSCH on the corresponding beam based on the precoding information, and send the PUSCH precoded on the corresponding beam.

Alternatively, the indication information comprises at least one of:

an SRS resource indication identifier (SRI) or an uplink transmission configuration indication (UL TCI) state index.

Alternatively, in response to the terminal being capable of supporting an uplink UL TCI state, the indication information comprises the SRI or the UL TCI state index; and in response to the terminal being incapable of supporting the uplink UL TCI state, the indication information comprises the SRI.

Alternatively, the indication information includes the UL TCI state index. The PUSCH sending module is configured to determine a UL TCI state indicated by the UL TCI state index, and determine beam related information corresponding to a beam for uplink cooperative transmission corresponding to the reference signal in the UL TCI state.

Figure 17:
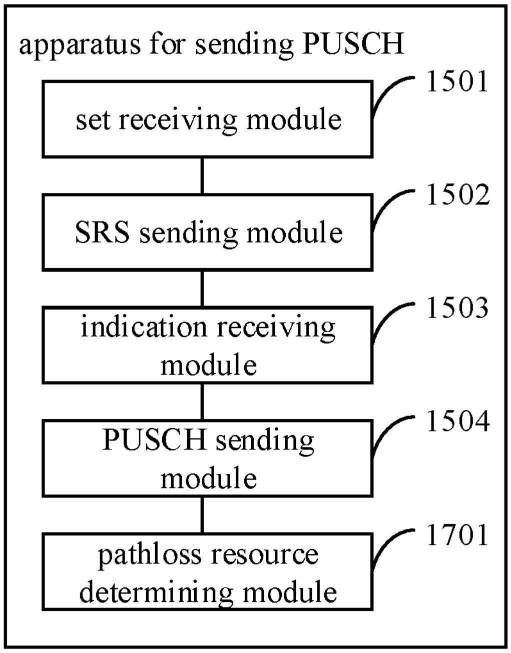
FIG. 17 is a block diagram illustrating an apparatus for sending a PUSCH according to still another embodiment of the present disclosure.

FIG. 17 is a block diagram illustrating an apparatus for sending a PUSCH according to another embodiment of the present disclosure. As shown in FIG. 17, the apparatus further includes as follows.

The pathloss resource determining module 1701 is configured to determine a pathloss reference signal (pathloss RS) resource of a beam corresponding to the UL TCI state index according to the UL TCI state.

Alternatively, the reference signal in the UL TCI state includes at least one of:

a channel state information reference signal (CSI-RS) or the SRS.

Alternatively, in response to an uplink transmission of the terminal supporting a beam consistency, the reference signal in the UL TCI state includes the CSI-RS or the SRS.

Alternatively, in response to an uplink transmission of the terminal not supporting a beam consistency, the reference signal in the UL TCI state includes the SRS.

Figure 18:
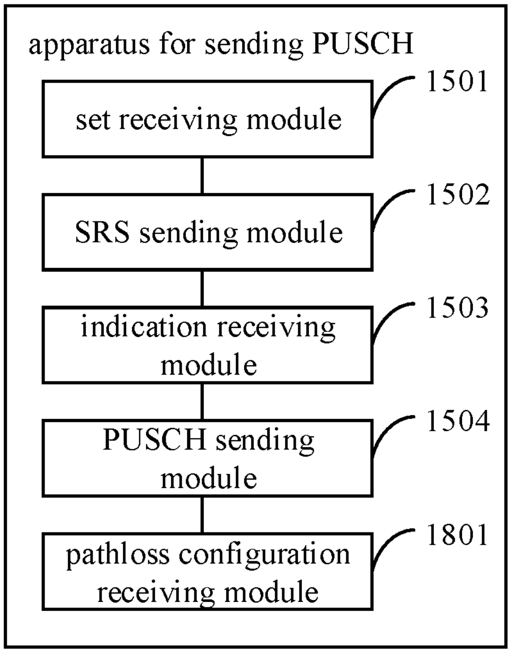
FIG. 18 is a block diagram illustrating an apparatus for sending a PUSCH according to still another embodiment of the present disclosure.

FIG. 18 is a block diagram illustrating an apparatus for sending a PUSCH according to still another embodiment of the present disclosure. As shown in FIG. 18, the apparatus further includes as follows.

The pathloss configuration receiving module 1801 in configured to receive resource configuration information sent by the base station to determine the pathloss RS resources for each beam.

Alternatively, the indication information includes the UL TCI state index. The PUSCH sending module is configured to receive beam related information sent by the base station, determine a plurality of pieces of candidate beam related information according to the beam configuration information, receive beam activation information sent by the base station, activate a plurality of pieces of available beam related information in the plurality of pieces of candidate beam-related information according to the beam activation information, and determine the beam related information corresponding to the beam for uplink cooperative transmission in the available beam related information according to the UL TCI state index.

Alternatively, the UL TCI state index is in one-to-one correspondence with the beam related information.

Alternatively, the UL TCI state index corresponds to a single piece of beam related information or a plurality of pieces of beam related information.

With regard to the apparatus in the above-mentioned embodiments, the specific manners for executing the operation in each module has been described in detail in the method embodiments, which will not be described in detail here.

Since the device embodiments basically correspond to the method embodiments, reference may be made on the related description of the method embodiments. The device embodiments described above are only illustrative, and the modules described as separate components may or may not be physically separated, and the components shown as modules may or may not be physical modules, that is, they may be located in one place, or they may be distributed onto a plurality of network modules. Part or all of the modules may be selected according to actual needs to achieve a purpose of a solution of embodiments in the present disclosure. It is understood and implemented by those skilled in the art without creative efforts.

Embodiments of the present disclosure also provide an electronic device. The electronic device includes:

a processor; and a memory for storing instructions executable by the processor.

The processor is configured to implement the method for indicating the PUSCH in any one of the above-mentioned embodiments.

Embodiments of the present disclosure also provide an electronic device. The electronic device includes:

a processor; and a memory for storing instructions executable by the processor.

The processor is configured to implement the method for sending the PUSCH in any one of the above-mentioned embodiments.

Embodiments of the present disclosure also provide a computer-readable storage medium. The computer-readable storage medium has stored therein computer programs that, when executed by a processor, cause steps of the method for indicating the PUSCH in any one of the above-mentioned embodiments to be implemented.

Embodiments of the present disclosure also provide a computer-readable storage medium. The computer-readable storage medium has stored therein computer programs that, when executed by a processor, cause steps of the method for sending the PUSCH in any one of the above-mentioned embodiments to be implemented.

Figure 19:
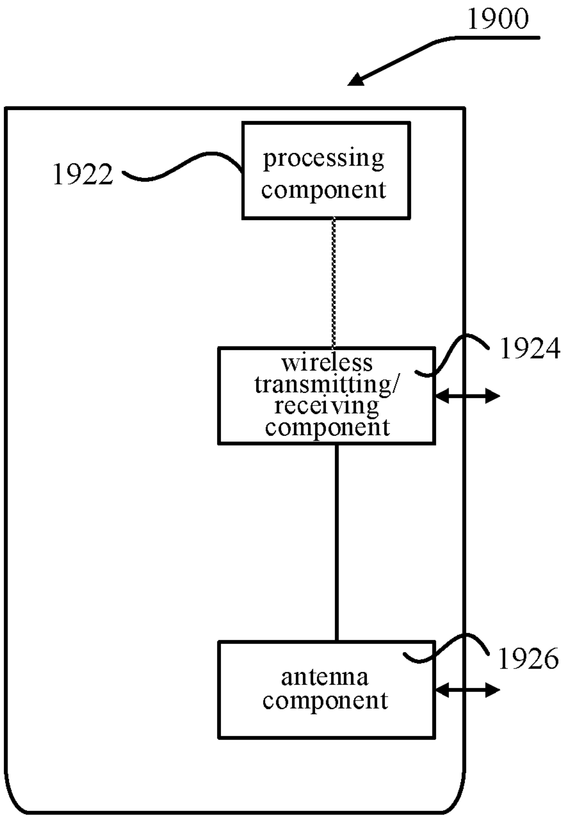
FIG. 19 is a block diagram illustrating a device for indicating a PUSCH according to an embodiment of the present disclosure.

As shown in FIG. 19, FIG. 19 is a block diagram of a device 1900 for indicating a PUSCH according to an embodiment of the present disclosure. The device 1900 may be provided as a base station. Referring to FIG. 19, the device 1900 includes a processing component 1922, a wireless transmitting/receiving component 1924, an antenna component 1926, and a signal processing component specific to a wireless interface. The processing component 1922 may further include one or more processors. One of the processors in the processing component 1922 may be configured to implement the method for indicating the PUSCH described in any one of the above-mentioned embodiments.

Figure 20:
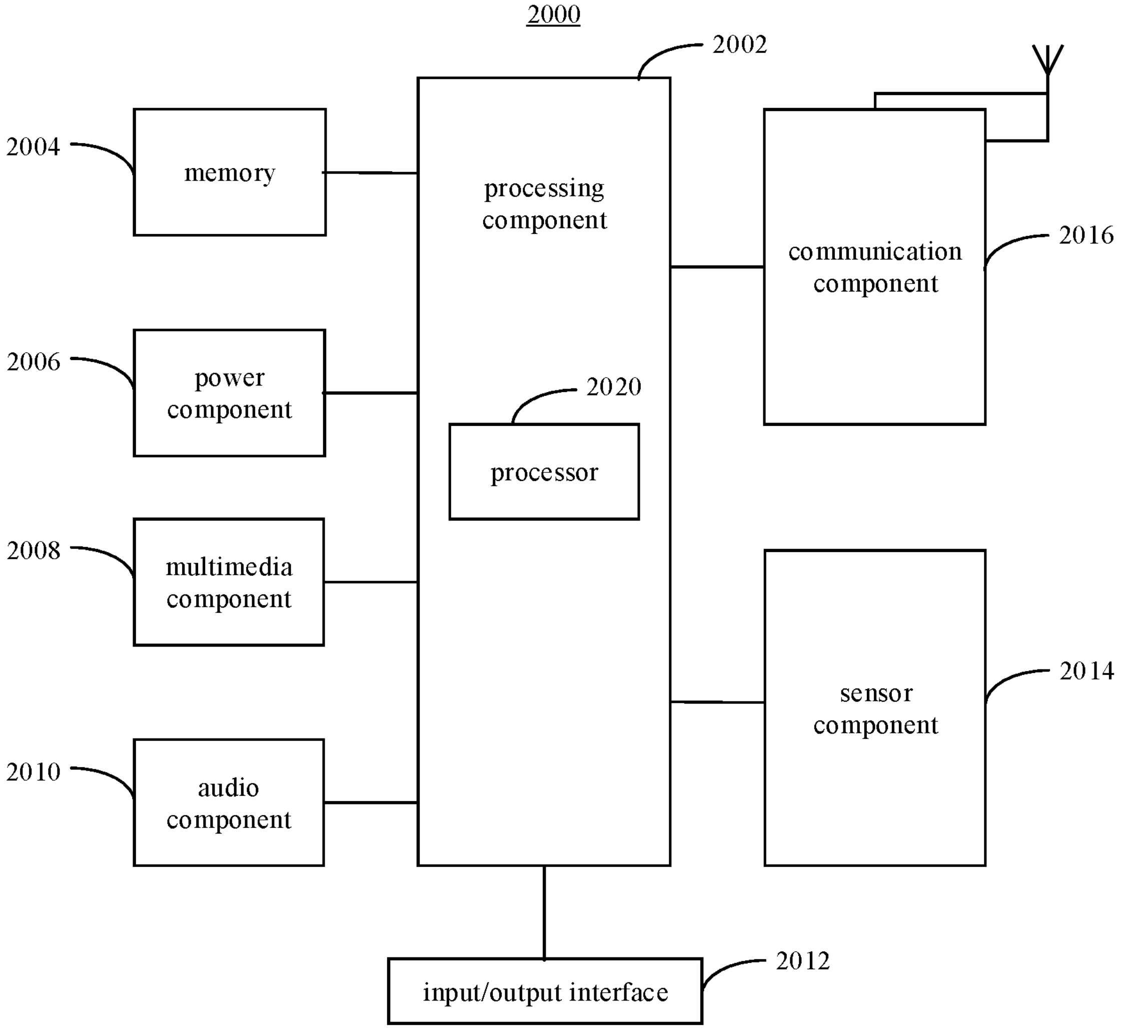
FIG. 20 is a block diagram illustrating a device for sending a PUSCH according to an embodiment of the present disclosure.

FIG. 20 is a block diagram of a device 2000 for sending a PUSCH according to an embodiment of the present disclosure. For example, the device 2000 may be a mobile phone, a computer, a digital broadcast terminal, a messaging device, a game console, a tablet device, a medical device, a fitness device, a personal digital assistant, or the like.

As shown in FIG. 20, the device 2000 may include one or more of the following components: a processing component 2002, a memory 2004, a power component 2006, a multimedia component 2008, an audio component 2010, an input/output (I/O) interface 2012, a sensor component 2014, and a communication component 2016.

The processing component 2002 typically controls overall operations of the device 2000, such as the operations associated with display, telephone calls, data communications, camera operations, and recording operations. The processing component 2002 may include one or more processors 2020 to execute instructions to perform all or some of the steps in the above-described method for sending the PUSCH. Moreover, the processing component 2002 may include one or more modules which facilitate the interaction between the processing component 2002 and other components. For instance, the processing component 2002 may include a multimedia module to facilitate the interaction between the multimedia component 2008 and the processing component 2002.

The memory 2004 is configured to store various types of data to support the operation of the device 2000. Examples of such data include instructions for any applications or methods operated on the device 2000, contact data, phonebook data, messages, pictures, videos, etc. The memory 2004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2006 provides power to various components of the device 2000. The power component 2006 may include a power management system, one or more power sources, and any other components associated with the generation, management, and distribution of power in the device 2000.

The multimedia component 2008 includes a screen providing an output interface between the device 2000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2008 includes a front camera and/or a rear camera. The front camera and/or the rear camera may receive an external multimedia datum while the device 2000 is in an operation mode, such as a photographing mode or a video mode. Each of the front camera and the rear camera may be a fixed optical lens system or have focus and optical zoom capability.

The audio component 2010 is configured to output and/or input audio signals. For example, the audio component 2010 includes a microphone (MIC) configured to receive an external audio signal when the device 2000 is in an operation mode, such as a call mode, a recording mode, and a voice recognition mode. The received audio signal may be further stored in the memory 2004 or transmitted via the communication component 2016. In some embodiments, the audio component 2010 further includes a speaker to output audio signals.

The I/O interface 2012 provides an interface between the processing component 2002 and peripheral interface modules, such as keyboards, click wheels, buttons, and the like. The buttons may include, but are not limited to, a home button, a volume button, a starting button, and a locking button.

The sensor component 2014 includes one or more sensors to provide status assessments of various aspects of the device 2000. For instance, the sensor component 2014 may detect an open/closed status of the device 2000, relative positioning of components, e.g., the display and the keypad, of the device 2000, a change in position of the device 2000 or a component of the device 2000, a presence or absence of user contact with the device 2000, an orientation or an acceleration/deceleration of the device 2000, and a change in temperature of the device 2000. The sensor component 2014 may include a proximity sensor configured to detect the presence of nearby objects without any physical contact. The sensor component 2014 may also include a light sensor, such as a CMOS or CCD image sensor, for use in imaging applications. In some embodiments, the sensor component 2014 may also include an accelerometer sensor, a gyroscope sensor, a magnetic sensor, a pressure sensor, or a temperature sensor.

The communication component 2016 is configured to facilitate communication, wired or wireless, between the device 2000 and other devices. The device 2000 can access a wireless network based on a communication standard, such as WiFi, 2G, 3G, 4G LTE, 5G NR, or a combination thereof. In one illustrative embodiment, the communication component 2016 receives a broadcast signal or broadcast associated information from an external broadcast management system via a broadcast channel. In one illustrative embodiment, the communication component 2016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In illustrative embodiments, the device 2000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described method for sending the PUSCH.

In illustrative embodiments, there is also provided a non-transitory computer-readable storage medium including instructions, such as included in the memory 2004, executable by the processor 2020 in the device 2000, for performing the above-described method for sending the PUSCH. For example, the non-transitory computer-readable storage medium may be a ROM, a RAM, a CD-ROM, a magnetic tape, a floppy disc, an optical data storage device, and the like.

According to embodiments of the present disclosure, the terminal may send SRS to the base station via the plurality of the beams on the plurality of the SRS resources. After receiving the SRS, the base station may detect an uplink channel based on the SRS received to determine the plurality of the beams suitable for cooperative transmission of the plurality of the antenna panels in the terminal. For example, the base station may detect signal strength information of the SRS received and determine the beam associated with the SRS resource where a channel strength is greater than a preset strength value, which is suitable for the cooperative transmission of the plurality of the antenna panels in the terminal.

The base station may determine the plurality of the beams for the cooperative transmission and the indication information corresponding to each of the beams, so as to indicate the terminal via the plurality of indications corresponding to the plurality of the beams, so that the terminal may determine the plurality of the beams for the cooperative transmission and the antenna panels corresponding to the plurality of the beams based on the indication information. In this way, the cooperative transmission via the plurality of the antenna panels may meet requirements of services which need improved transmission of the PUSCH.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and the examples be considered as illustrative only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

It could be understood that in the specification, the terms “first,” “second,” etc. are only used to distinguish an entity or operation from another entity or operation, and do not require or imply that there is an actual relationship or order between these entities or operations. The terms “comprise,” “include” or any other variation thereof are intended to cover a non-exclusive inclusion, so that a process, method, article or apparatus including a series of elements includes not only those elements but also other elements not expressly listed, or also elements inherent in the process, method, article, or apparatus. Without further limitations, an element defined by a phrase “comprising a . . . ” does not exclude presence of additional identical elements in the process, method, article or apparatus including the element.

The methods and the apparatus provided by embodiments of the present disclosure have been described above in detail. In the specification, embodiments have been used to illustrate principles and implementations of the present disclosure. The descriptions of the above-mentioned embodiments are only used to help understand methods and core ideas of the present disclosure. At the same time, for those skilled in the art, according to the idea of the present disclosure, there will be changes in a specific implementation and an application scope. In summary, the content of the specification is not be understood as limitation on the present disclosure.

What is claimed is:

1. A method for indicating a physical uplink shared channel (PUSCH), comprising:

sending, by a base station and for a terminal, one or more sounding reference signal (SRS) resource sets for uplink data transmission scheduling, wherein SRS resources in the SRS resource sets are associated with beam related information;

receiving, by the base station, an SRS sent by the terminal based on the SRS resource; and sending, by the base station and to the terminal, indication information corresponding to each of a plurality of beams for uplink cooperative transmission determined by the base station according to the SRS received, wherein each of the plurality of beams corresponds to a different transmission and reception point (TRP) in the base station, wherein the indication information indicates the terminal to determine the beam related information corresponding to a beam for the uplink cooperative transmission, and to send the PUSCH based on the beam corresponding to the beam related information determined, wherein the indication information comprises an uplink transmission configuration indication (UL TCI) state index, and a UL TCI state indicated by the UL TCI state index is configured with at least one of a channel state information reference signal (CSI-RS) or the SRS as a source reference signal, and wherein the method further comprises:

indicating, by the base station and for the terminal, a pathloss reference signal (pathloss RS) resource associated with a beam corresponding to the UL TCI state index, comprising:

indicating the pathloss RS resource associated with the beam corresponding to the UL TCI state index via the UL TCI state; or indicating the pathloss RS resource associated with each of the plurality of beams by sending resource configuration to the terminal.

2. The method according to claim 1, further comprising:

determining, by the base station, precoding information applicable to each of the plurality of beams; and sending, by the base station, the precoding information to the terminal.

3. The method according to claim 1, wherein the indication information comprises at least one of following parameters:

an SRS resource indication identifier (SRI) or the-UL TCI state index.

4. The method according to claim 1, wherein in response to an uplink transmission of the terminal supporting a beam consistency, the UL TCI state indicated by the UL TCI state index is configured with the CSI-RS as the source reference signal, or is configured with the SRS as the source reference signal.

5. The method according to claim 1, wherein in response to an uplink transmission of the terminal not supporting a beam consistency, the UL TCI state indicated by the UL TCI state index is configured with the SRS as the source reference signal.

6. The method according to claim 3, wherein in response to the terminal being capable of supporting an uplink UL TCI state, the indication information comprises the SRI or the UL TCI state index; or in response to the terminal being incapable of supporting the uplink UL TCI state, the indication information comprises the SRI.

7. The method according to claim 3, wherein the indication information comprises the UL TCI state index, and the method further comprises:

sending beam configuration information to the terminal to configure a plurality of pieces of candidate beam related information for the terminal; and sending beam activation information to the terminal to instruct the terminal to activate a plurality of pieces of available beam related information in the plurality of pieces of candidate beam related information;

wherein the UL TCI state index is configured to instruct the terminal to determine the beam related information corresponding to the beam for the uplink cooperative transmission in the plurality of pieces of available beam related information.

8. The method according to claim 3, wherein the UL TCI state index is in one-to-one correspondence with the beam related information.

9. The method according to claim 3, wherein the UL TCI state index corresponds to a single piece of beam related information or a plurality of pieces of beam related information.

10. A method for sending a physical uplink shared channel (PUSCH), comprising:

receiving, by a terminal, one or more sounding reference signal (SRS) resource sets for uplink data transmission scheduling and configured by a base station, wherein SRS resources in the SRS resource sets are associated with beam related information;

sending, by the terminal, an SRS to the base station based on the SRS resources; and receiving, by the terminal and from the base station, indication information corresponding to each of a plurality of beams for uplink cooperative transmission determined by the base station according to the SRS received, wherein each of the plurality of beams corresponds to a different transmission and reception point (TRP) in the base station, wherein the indication information indicates the terminal to determine the beam related information corresponding to a beam for the uplink cooperative transmission, and to send the PUSCH to the base station based on the beam corresponding to the beam related information determined, wherein the indication information comprises an uplink transmission configuration indication (UL TCI) state index, and a UL TCI state indicated by the UL TCI state index is configured with at least one of a channel state information reference signal (CSI-RS) or the SRS as a source reference signal, and wherein the method further comprises:

determining, by the terminal, a pathloss reference signal (pathloss RS) resource associated with a beam corresponding to the UL TCI state index, comprising:

determining the pathloss RS resource associated with the beam corresponding to the UL TCI state index based on the UL TCI state; or determining the pathloss RS resource associated with each of the plurality of beams based on resource configuration received from the base station.

11. The method according to claim 10, further comprising:

receiving, by the terminal, precoding information applicable to each of the plurality of beams sent by the base station;

wherein sending the PUSCH to the base station based on the beam corresponding to the beam related information determined includes:

precoding the PUSCH on the corresponding beam based on the precoding information, and sending the PUSCH precoded on the corresponding beam.

12. The method according to claim 10, wherein the indication information comprises at least one of following parameters:

an SRS resource indication identifier (SRI) or the UL TCI state index.

13. The method according to claim 12, wherein the indication information comprises the UL TCI state index, and determining the beam related information corresponding to the beam for the uplink cooperative transmission according to the indication information comprises:

determining a UL TCI state indicated by the UL TCI state index, and determining the beam related information corresponding to the beam for the uplink cooperative transmission corresponding to a reference signal in the UL TCI state.

14. The method according to claim 12, wherein the indication information comprises the UL TCI state index, and determining the beam related information corresponding to the beam for the uplink cooperative transmission according to the indication information comprises:

receiving beam configuration information sent by the base station, and determining a plurality of pieces of candidate beam related information according to the beam configuration information;

receiving beam activation information sent by the base station, and activating a plurality of pieces of available beam related information in the plurality of pieces of candidate beam related information according to the beam activation information; and determining the beam related information corresponding to the beam for the uplink cooperative transmission from the plurality of pieces of available beam related information according to the UL TCI state index.

15. An electronic device, comprising:

a processor; and a memory for storing instructions executable by the processor;

wherein the processor is configured to:

send a terminal one or more sounding reference signal (SRS) resource sets for uplink data transmission scheduling, wherein SRS resources in the SRS resource sets are associated with beam related information;

receive an SRS sent by the terminal based on the SRS resource; and send the terminal-indication information corresponding to each of a plurality of beams for uplink cooperative transmission determined by the base station according to the SRS received, wherein each of the plurality of beams corresponds to a different transmission and reception point (TRP) in the base station, wherein the indication information-indicates the terminal to determine the beam related information corresponding to a beam for the uplink cooperative transmission, and to send the PUSCH based on the beam corresponding to the beam related information determined, wherein the indication information comprises an uplink transmission configuration indication (UL TCI) state index, and a UL TCI state indicated by the UL TCI state index is configured with at least one of a channel state information reference signal (CSI-RS) or the SRS as a source reference signal; and indicate a pathloss reference signal (pathloss RS) resource associated with a beam corresponding to the UL TCI state index in one of the following manners:

indicating the pathloss RS resource associated with the beam corresponding to the UL TCI state index via the UL TCI state; or indicating the pathloss RS resource associated with each of the plurality of beams by sending resource configuration to the terminal.

16. The electronic device according to claim 15, wherein the processor is further configured to:

determining precoding information applicable to each of the plurality of beams; and sending the precoding information to the terminal.

* * * * *